United States Patent
Khoshnevisan et al.

(10) Patent No.: US 12,160,850 B2
(45) Date of Patent: Dec. 3, 2024

(54) TECHNIQUES FOR QUASI-COLOCATION PRIORITIZATION RULE FOR CONTROL CHANNEL REPETITION

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/647,802

(22) Filed: Jan. 12, 2022

(65) Prior Publication Data

US 2022/0225291 A1    Jul. 14, 2022

Related U.S. Application Data

(60) Provisional application No. 63/199,650, filed on Jan. 14, 2021.

(51) Int. Cl.
*H04W 72/02* (2009.01)
*H04W 24/08* (2009.01)
(Continued)

(52) U.S. Cl.
CPC ........... *H04W 72/02* (2013.01); *H04W 24/08* (2013.01); *H04W 72/046* (2013.01); *H04W 72/23* (2023.01); *H04W 72/56* (2023.01)

(58) Field of Classification Search
None
See application file for complete search history.

(56) References Cited

U.S. PATENT DOCUMENTS

| 2020/0112964 A1* | 4/2020 | Yang | H04W 72/51 |
| 2020/0154402 A1* | 5/2020 | Lee | H04W 56/001 |

(Continued)

FOREIGN PATENT DOCUMENTS

| EP | 3905574 A1 * | 11/2021 | H04B 7/0695 |
| EP | 4096321 A1 * | 11/2022 | H04B 7/0639 |
| WO | WO-2020064512 A1 | 4/2020 | |

OTHER PUBLICATIONS

International Search Report and Written Opinion—PCT/US2022/070179—ISA/EPO—May 6, 2022.
(Continued)

*Primary Examiner* — Kenny S Lin
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive configuration information indicating physical downlink control channel (PDCCH) repetition for a first control resource set (CORESET) having a first transmission configuration indicator (TCI) state and a second CORESET having a second TCI state. The UE may monitor, based at least in part on the PDCCH repetition, PDCCH for a first set of CORESETs and a second set of CORESETs that at least partially overlap with each other in time, wherein PDCCH monitoring for the first set of CORESETs is based at least in part on a first spatial quasi-colocation (QCL) property and PDCCH monitoring for the second set of CORESETs is based at least in part on a second spatial QCL property different than the first spatial QCL property. Numerous other aspects are described.

30 Claims, 14 Drawing Sheets

(51) Int. Cl.
*H04W 72/044* (2023.01)
*H04W 72/23* (2023.01)
*H04W 72/56* (2023.01)

(56) References Cited

U.S. PATENT DOCUMENTS

| | | | |
|---|---|---|---|
| 2020/0413412 A1 | 12/2020 | Kim et al. | |
| 2021/0045125 A1* | 2/2021 | Mondal | H04W 80/08 |
| 2021/0050936 A1* | 2/2021 | Seo | H04W 72/20 |
| 2021/0099981 A1* | 4/2021 | Cirik | H04W 72/23 |
| 2021/0111846 A1* | 4/2021 | Lee | H04L 5/0053 |
| 2021/0195601 A1* | 6/2021 | Khoshnevisan | H04W 8/24 |
| 2021/0314964 A1* | 10/2021 | Zhou | H04W 72/56 |
| 2022/0070704 A1* | 3/2022 | Khoshnevisan | H04L 27/2602 |
| 2022/0217694 A1* | 7/2022 | Kim | H04L 1/1864 |
| 2022/0338222 A1* | 10/2022 | Kim | H04W 72/1273 |
| 2023/0036240 A1* | 2/2023 | You | H04W 84/04 |
| 2023/0106730 A1* | 4/2023 | Chen | H04L 5/0064 |
| | | | 370/329 |
| 2023/0388058 A1* | 11/2023 | Gao | H04L 5/0055 |
| 2023/0413081 A1* | 12/2023 | Zhang | H04L 5/0094 |
| 2024/0040584 A1* | 2/2024 | Yuan | H04W 72/23 |
| 2024/0098531 A1* | 3/2024 | Gao | H04B 7/0695 |
| 2024/0106606 A1* | 3/2024 | He | H04L 5/0053 |

OTHER PUBLICATIONS

VIVO: "Further Discussion on Enhancement of MTRP Operation", 3GPP Draft, R1-2007645, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1. No. e-Meeting, Oct. 26, 2020-Nov. 13, 2020, Oct. 24, 2020 (Oct. 24, 2020), XP051946454, 15 Pages, Retrieved from the Internet: URL:https://ftp.3gpp.org/tsg_ran/WG1_RL1/TSGR1_103-e/Docs/R1-2007645.zip, R1-2007645.docx [retrieved on Oct. 24, 2020] Section 3.3, Sections 3 and 4, Subsection "TDM", p. second, paqe 2-paqe 13.

* cited by examiner

TECHNIQUES FOR QUASI-COLOCATION PRIORITIZATION RULE FOR CONTROL CHANNEL REPETITION

CROSS-REFERENCE TO RELATED APPLICATION

This Patent application claims priority to U.S. Provisional Patent Application No. 63/199,650, filed on Jan. 14, 2021, entitled "TECHNIQUES FOR QUASI-COLOCATION PRIORITIZATION RULE FOR CONTROL CHANNEL REPETITION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a quasi-colocation (QCL) prioritization rule for control channel repetition.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving configuration information indicating a first physical downlink control channel (PDCCH) repetition for a first control resource set (CORESET) having a first transmission configuration indicator (TCI) state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and monitoring, based at least in part on the configuration information, PDCCH for a first set of CORESETs and a second set of CORESETs that at least partially overlap with each other in time, wherein PDCCH monitoring for the first set of CORESETs is based at least in part on a first spatial QCL property and PDCCH monitoring for the second set of CORESETs is based at least in part on a second spatial QCL property different than the first spatial QCL property.

In some aspects, the method includes selecting the first set of CORESETs from a plurality of CORESETs based at least in part on a priority rule; and selecting the second set of CORESETs from the plurality of CORESETs, excluding the first set of CORESETs, based at least in part on the priority rule.

In some aspects, the priority rule is a search space type first, carrier index second, search space set index third priority rule.

In some aspects, the method includes determining the first spatial QCL property based at least in part on the first set of CORESETs; and determining the second spatial QCL property based at least in part on the second set of CORESETs.

In some aspects, selecting the first set of CORESETs further comprises: selecting a CORESET of the first set of CORESETs based at least in part on a priority rule; and identifying a remainder of CORESETs of the first set of CORESETs based at least in part on the remainder of CORESETs having a same spatial QCL property as the selected CORESET.

In some aspects, the method includes selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and selecting the second set of CORESETs to include the other CORESET.

In some aspects, the priority rule is a first priority rule, the first set of CORESETs includes a plurality of CORESETs that are linked with other CORESETs, and the selection of the second set of CORESETs is based at least in part on a second priority rule.

In some aspects, the method includes selecting the first set of CORESETs to include the first CORESET based at least in part on the first CORESET including the first PDCCH repetition; and selecting the second set of CORESETs to include the second CORESET based at least in part on the second CORESET including the second PDCCH repetition.

In some aspects, selecting the first set of CORESETs and the second set of CORESETs is based at least in part on a priority rule relating to the first CORESET including the first PDCCH repetition and the second CORESET including the second PDCCH repetition.

In some aspects, the UE is capable of contemporaneous communication using at least two spatial QCL properties, and performing the PDCCH monitoring for the first set of CORESETs and the second set of CORESETs is based at least in part on the UE being capable of contemporaneous communication using at least two spatial QCL properties.

In some aspects, the method includes transmitting information indicating that the UE is capable of contemporaneous communication using at least two spatial QCL properties, wherein the configuration information is based at least in part on the information indicating that the UE is capable of contemporaneous communication using at least two spatial QCL properties.

In some aspects, a method of wireless communication performed by a UE includes receiving configuration information indicating PDCCH repetition indicating a link between a first CORESET and a second CORESET, wherein the second CORESET is included in a plurality of CORESETs having at least two different spatial QCL properties that are associated with overlapping monitoring occasions; and monitoring PDCCH using a selected spatial QCL property corresponding to a selected CORESET of the plurality of CORESETs, wherein the selected CORESET is selected based at least in part on a priority rule that is based at least in part on the link between the first CORESET and the second CORESET.

In some aspects, the priority rule prioritizes PDCCH repetition linkage over one or more other parameters for selection of the selected CORESET.

In some aspects, the selected CORESET is the second CORESET.

In some aspects, the priority rule prioritizes PDCCH repetition linkage over one or more other parameters for selection of the selected CORESET based at least in part on a monitoring occasion of the second CORESET being associated with the link between the first CORESET and the second CORESET.

In some aspects, the priority rule prioritizes PDCCH repetition linkage over all other parameters for selection of the selected CORESET.

In some aspects, the priority rule is a PDCCH repetition linkage first, search space type second, carrier index third, search space set index fourth priority rule.

In some aspects, the priority rule is a search space type first, PDCCH repetition linkage second, carrier index third, search space set index fourth priority rule.

In some aspects, the first CORESET is in a monitoring occasion that does not overlap the overlapping monitoring occasions.

In some aspects, at least two CORESETs of the plurality of CORESETs are on different component carriers.

In some aspects, the plurality of CORESETs are on a single component carrier.

In some aspects, a method of wireless communication performed by a base station includes transmitting, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and transmitting a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property.

In some aspects, the method includes selecting the first set of CORESETs from a plurality of CORESETs based at least in part on a priority rule; and selecting the second set of CORESETs from the plurality of CORESETs, excluding the first set of CORESETs, based at least in part on the priority rule.

In some aspects, the priority rule is a search space type first, carrier index second, search space set index third priority rule.

In some aspects, the method includes determining the first spatial QCL property based at least in part on the first set of CORESETs; and determining the second spatial QCL property based at least in part on the second set of CORESETs.

In some aspects, selecting the first set of CORESETs further comprises: selecting a CORESET of the first set of CORESETs based at least in part on a priority rule; and identifying a remainder of CORESETs of the first set of CORESETs based at least in part on the remainder of CORESETs having a same spatial QCL property as the selected CORESET.

In some aspects, the method includes selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and selecting the second set of CORESETs to include the other CORESET.

In some aspects, the priority rule is a first priority rule, the first set of CORESETs includes a plurality of CORESETs that are linked with other CORESETs, and the selection of the second set of CORESETs is based at least in part on a second priority rule.

In some aspects, the method includes selecting the first set of CORESETs to include the first CORESET based at least in part on the first CORESET including the first PDCCH repetition; and selecting the second set of CORESETs to include the second CORESET based at least in part on the second CORESET including the second PDCCH repetition.

In some aspects, selecting the first set of CORESETs and the second set of CORESETs is based at least in part on a priority rule relating to the first CORESET including the first PDCCH repetition and the second CORESET including the second PDCCH repetition.

In some aspects, the UE is capable of contemporaneous communication using at least two spatial QCL properties, and performing the PDCCH monitoring for the first set of CORESETs and the second set of CORESETs is based at least in part on the UE being capable of contemporaneous communication using at least two spatial QCL properties.

In some aspects, the method includes receiving information indicating that the UE is capable of contemporaneous communication using at least two spatial QCL properties, wherein the configuration information is based at least in part on the information indicating that the UE is capable of contemporaneous communication using at least two spatial QCL properties.

In some aspects, a method of wireless communication performed by a base station includes transmitting, to a UE, configuration information indicating PDCCH repetition indicating a link between a first CORESET and a second CORESET, wherein the second CORESET is included in a plurality of CORESETs having at least two different spatial QCL properties that are associated with overlapping monitoring occasions; and transmitting a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET.

In some aspects, the priority rule prioritizes PDCCH repetition linkage over one or more other parameters for selection of the selected CORESET.

In some aspects, the selected CORESET is the second CORESET.

In some aspects, the priority rule prioritizes PDCCH repetition linkage over one or more other parameters for selection of the selected CORESET based at least in part on a monitoring occasion of the second CORESET being associated with the link between the first CORESET and the second CORESET.

In some aspects, the priority rule prioritizes PDCCH repetition linkage over all other parameters for selection of the selected CORESET.

In some aspects, the priority rule is a PDCCH repetition linkage first, search space type second, carrier index third, search space set index fourth priority rule.

In some aspects, the priority rule is a search space type first, PDCCH repetition linkage second, carrier index third, search space set index fourth priority rule.

In some aspects, the first CORESET is in a monitoring occasion that does not overlap the overlapping monitoring occasions.

In some aspects, at least two CORESETs of the plurality of CORESETs are on different component carriers.

In some aspects, the plurality of CORESETs are on a single component carrier.

In some aspects, a UE for wireless communication includes a memory and one or more processors coupled to the memory, the memory and the one or more processors configured to: receive configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and monitor, based at least in part on the configuration information, PDCCH for a first set of CORESETs and a second set of CORESETs that at least partially overlap with each other in time, wherein PDCCH monitoring for the first set of CORESETs is based at least in part on a first spatial QCL property and PDCCH monitoring for the second set of CORESETs is based at least in part on a second spatial QCL property different than the first spatial QCL property.

In some aspects, the one or more processors are further configured to: select the first set of CORESETs from a plurality of CORESETs based at least in part on a priority rule; and select the second set of CORESETs from the plurality of CORESETs, excluding the first set of CORESETs, based at least in part on the priority rule.

In some aspects, the priority rule is a search space type first, carrier index second, search space set index third priority rule.

In some aspects, the one or more processors are further configured to: determine the first spatial QCL property based at least in part on the first set of CORESETs; and determine the second spatial QCL property based at least in part on the second set of CORESETs.

In some aspects, the one or more processors, when selecting the first set of CORESETs, are configured to: select a CORESET of the first set of CORESETs based at least in part on a priority rule; and identify a remainder of CORESETs of the first set of CORESETs based at least in part on the remainder of CORESETs having a same spatial QCL property as the selected CORESET.

In some aspects, the one or more processors are further configured to: select the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and select the second set of CORESETs to include the other CORESET.

In some aspects, the priority rule is a first priority rule, the first set of CORESETs includes a plurality of CORESETs that are linked with other CORESETs, and the selection of the second set of CORESETs is based at least in part on a second priority rule.

In some aspects, the one or more processors are further configured to: select the first set of CORESETs to include the first CORESET based at least in part on the first CORESET including the first PDCCH repetition; and select the second set of CORESETs to include the second CORESET based at least in part on the second CORESET including the second PDCCH repetition.

In some aspects, the one or more processors, when selecting the first set of CORESETs and the second set of CORESETs is based at least in part on a priority rule relating to the first CORESET, are configured to the first PDCCH repetition and the second CORESET including the second PDCCH repetition.

In some aspects, the UE is capable of contemporaneous communication using at least two spatial QCL properties, and performing the PDCCH monitoring for the first set of CORESETs and the second set of CORESETs is based at least in part on the UE being capable of contemporaneous communication using at least two spatial QCL properties.

In some aspects, the one or more processors are further configured to: transmit information indicating that the UE is capable of contemporaneous communication using at least two spatial QCL properties, wherein the configuration information is based at least in part on the information indicating that the UE is capable of contemporaneous communication using at least two spatial QCL properties.

In some aspects, a UE for wireless communication includes a memory and one or more processors coupled to the memory, the memory and the one or more processors configured to: receive configuration information indicating PDCCH repetition indicating a link between a first CORESET and a second CORESET, wherein the second CORESET is included in a plurality of CORESETs having at least two different spatial QCL properties that are associated with overlapping monitoring occasions; and monitor PDCCH using a selected spatial QCL property corresponding to a selected CORESET of the plurality of CORESETs, wherein the selected CORESET is selected based at least in part on a priority rule that is based at least in part on the link between the first CORESET and the second CORESET.

In some aspects, the priority rule prioritizes PDCCH repetition linkage over one or more other parameters for selection of the selected CORESET.

In some aspects, the selected CORESET is the second CORESET.

In some aspects, the priority rule prioritizes PDCCH repetition linkage over one or more other parameters for selection of the selected CORESET based at least in part on a monitoring occasion of the second CORESET being associated with the link between the first CORESET and the second CORESET.

In some aspects, the priority rule prioritizes PDCCH repetition linkage over all other parameters for selection of the selected CORESET.

In some aspects, the priority rule is a PDCCH repetition linkage first, search space type second, carrier index third, search space set index fourth priority rule.

In some aspects, the priority rule is a search space type first, PDCCH repetition linkage second, carrier index third, search space set index fourth priority rule.

In some aspects, the first CORESET is in a monitoring occasion that does not overlap the overlapping monitoring occasions.

In some aspects, at least two CORESETs of the plurality of CORESETs are on different component carriers.

In some aspects, the plurality of CORESETs are on a single component carrier.

In some aspects, a base station for wireless communication includes a memory and one or more processors coupled to the memory, the memory and the one or more processors configured to: transmit, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and transmit a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property.

In some aspects, the one or more processors are further configured to: select the first set of CORESETs from a plurality of CORESETs based at least in part on a priority rule; and select the second set of CORESETs from the plurality of CORESETs, excluding the first set of CORESETs, based at least in part on the priority rule.

In some aspects, the priority rule is a search space type first, carrier index second, search space set index third priority rule.

In some aspects, the one or more processors are further configured to: determine the first spatial QCL property based at least in part on the first set of CORESETs; and determine the second spatial QCL property based at least in part on the second set of CORESETs.

In some aspects, the one or more processors, when selecting the first set of CORESETs, are configured to: select a CORESET of the first set of CORESETs based at least in part on a priority rule; and identify a remainder of CORESETs of the first set of CORESETs based at least in part on the remainder of CORESETs having a same spatial QCL property as the selected CORESET.

In some aspects, the one or more processors are further configured to: select the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and select the second set of CORESETs to include the other CORESET.

In some aspects, the priority rule is a first priority rule, the first set of CORESETs includes a plurality of CORESETs that are linked with other CORESETs, and the selection of the second set of CORESETs is based at least in part on a second priority rule.

In some aspects, the one or more processors are further configured to: select the first set of CORESETs to include the first CORESET based at least in part on the first CORESET including the first PDCCH repetition; and select the second set of CORESETs to include the second CORESET based at least in part on the second CORESET including the second PDCCH repetition.

In some aspects, the one or more processors, when selecting the first set of CORESETs and the second set of CORESETs is based at least in part on a priority rule relating to the first CORESET, are configured to the first PDCCH repetition and the second CORESET including the second PDCCH repetition.

In some aspects, the UE is capable of contemporaneous communication using at least two spatial QCL properties, and performing the PDCCH monitoring for the first set of CORESETs and the second set of CORESETs is based at least in part on the UE being capable of contemporaneous communication using at least two spatial QCL properties.

In some aspects, the one or more processors are further configured to: receive information indicating that the UE is capable of contemporaneous communication using at least two spatial QCL properties, wherein the configuration information is based at least in part on the information indicating that the UE is capable of contemporaneous communication using at least two spatial QCL properties.

In some aspects, a base station for wireless communication includes a memory and one or more processors coupled to the memory, the memory and the one or more processors configured to: transmit, to a UE, configuration information indicating PDCCH repetition indicating a link between a first CORESET and a second CORESET, wherein the second CORESET is included in a plurality of CORESETs having at least two different spatial QCL properties that are associated with overlapping monitoring occasions; and transmit a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET.

In some aspects, the priority rule prioritizes PDCCH repetition linkage over one or more other parameters for selection of the selected CORESET.

In some aspects, the selected CORESET is the second CORESET.

In some aspects, the priority rule prioritizes PDCCH repetition linkage over one or more other parameters for selection of the selected CORESET based at least in part on a monitoring occasion of the second CORESET being associated with the link between the first CORESET and the second CORESET.

In some aspects, the priority rule prioritizes PDCCH repetition linkage over all other parameters for selection of the selected CORESET.

In some aspects, the priority rule is a PDCCH repetition linkage first, search space type second, carrier index third, search space set index fourth priority rule.

In some aspects, the priority rule is a search space type first, PDCCH repetition linkage second, carrier index third, search space set index fourth priority rule.

In some aspects, the first CORESET is in a monitoring occasion that does not overlap the overlapping monitoring occasions.

In some aspects, at least two CORESETs of the plurality of CORESETs are on different component carriers.

In some aspects, the plurality of CORESETs are on a single component carrier.

In some aspects, a non-transitory computer-readable medium storing a set of instructions for wireless communication includes one or more instructions that, when executed by one or more processors of a UE, cause the UE to: receive configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and monitor, based at least in part on the configuration information, PDCCH for a first set of CORESETs and a second set of CORESETs that at least partially overlap with each other in time, wherein PDCCH monitoring for the first set of CORESETs is based at least in part on a first spatial QCL property and PDCCH monitoring for the second set of CORESETs is based at least in part on a second spatial QCL property different than the first spatial QCL property.

In some aspects, a non-transitory computer-readable medium storing a set of instructions for wireless communication includes one or more instructions that, when executed by one or more processors of an UE, cause the UE to: receive configuration information indicating PDCCH repetition indicating a link between a first CORESET and a second CORESET, wherein the second CORESET is included in a plurality of CORESETs having at least two different spatial QCL properties that are associated with overlapping monitoring occasions; and monitor PDCCH using a selected spatial QCL property corresponding to a selected CORESET of the plurality of CORESETs, wherein the selected CORESET is selected based at least in part on a priority rule that is based at least in part on the link between the first CORESET and the second CORESET.

In some aspects, a non-transitory computer-readable medium storing a set of instructions for wireless communication includes one or more instructions that, when executed by one or more processors of a base station, cause the base station to: transmit, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and transmit a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property.

In some aspects, a non-transitory computer-readable medium storing a set of instructions for wireless communication includes one or more instructions that, when executed by one or more processors of a base station, cause the base station to: transmit, to a UE, configuration information indicating PDCCH repetition indicating a link between a first CORESET and a second CORESET, wherein the second CORESET is included in a plurality of CORESETs having at least two different spatial QCL properties that are associated with overlapping monitoring occasions; and transmit a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET.

In some aspects, an apparatus for wireless communication includes means for receiving configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and means for monitoring, based at least in part on the configuration information, PDCCH for a first set of CORESETs and a second set of CORESETs that at least partially overlap with each other in time, wherein PDCCH monitoring for the first set of CORESETs is based at least in part on a first spatial QCL property and PDCCH monitoring for the second set of CORESETs is based at least in part on a second spatial QCL property different than the first spatial QCL property.

In some aspects, an apparatus for wireless communication includes means for receiving configuration information indicating PDCCH repetition indicating a link between a first CORESET and a second CORESET, wherein the second CORESET is included in a plurality of CORESETs having at least two different spatial QCL properties that are associated with overlapping monitoring occasions; and means for monitoring PDCCH using a selected spatial QCL property corresponding to a selected CORESET of the plurality of CORESETs, wherein the selected CORESET is selected based at least in part on a priority rule that is based at least in part on the link between the first CORESET and the second CORESET.

In some aspects, an apparatus for wireless communication includes means for transmitting, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and means for transmitting a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property.

In some aspects, an apparatus for wireless communication includes means for transmitting, to a UE, configuration information indicating PDCCH repetition indicating a link between a first CORESET and a second CORESET, wherein the second CORESET is included in a plurality of CORE- SETs having at least two different spatial QCL properties that are associated with overlapping monitoring occasions; and means for transmitting a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
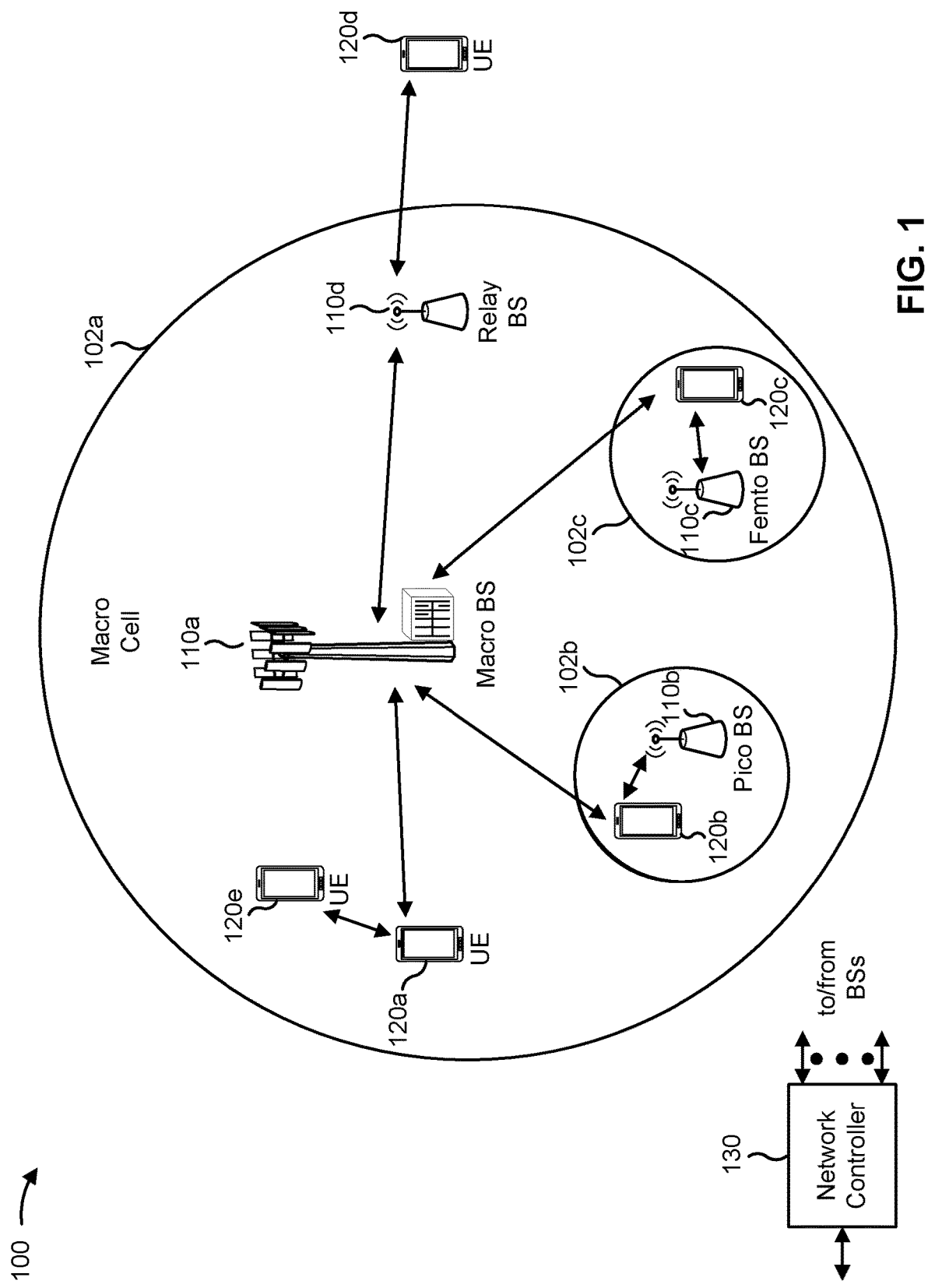
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
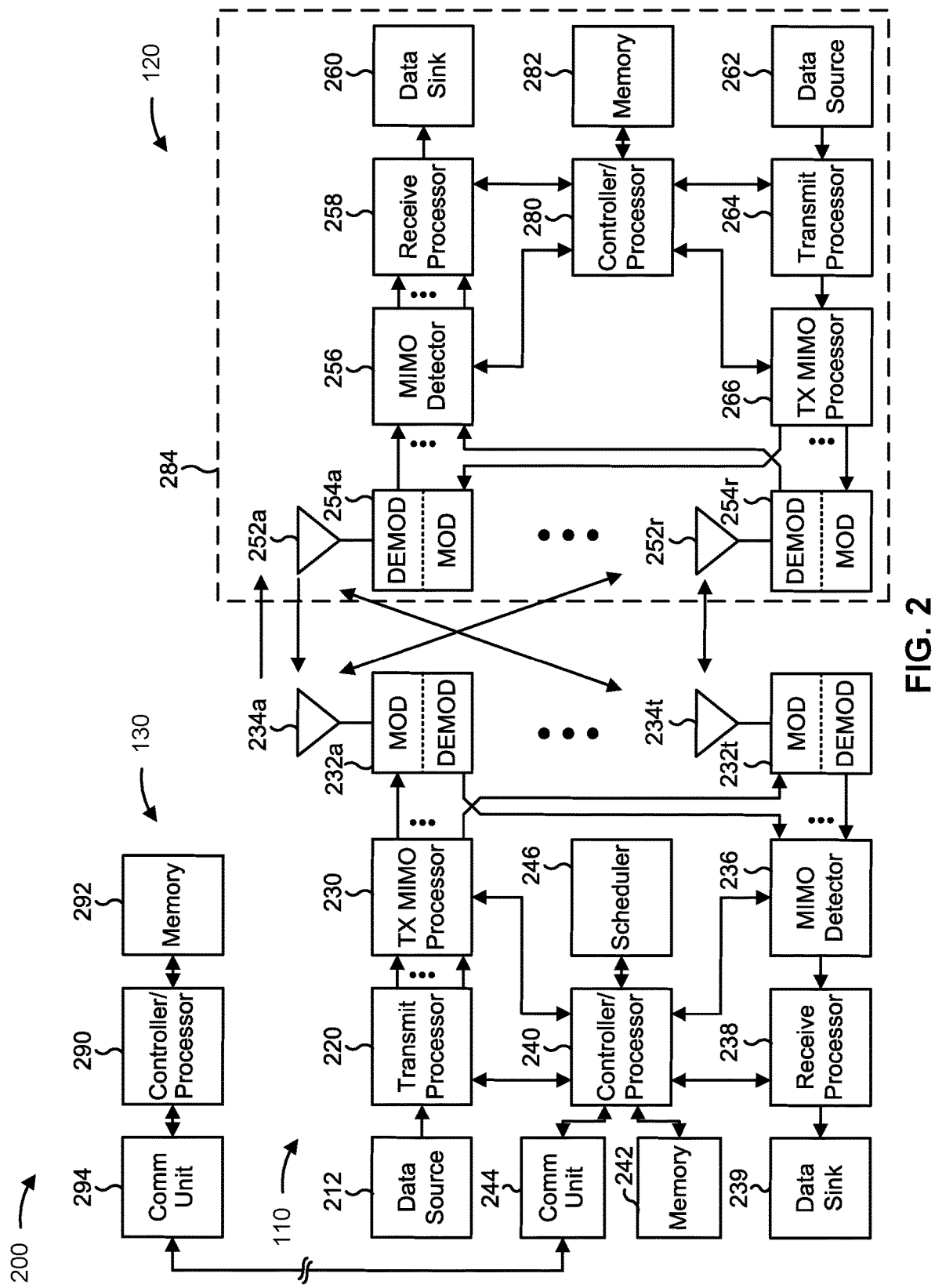
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with QCL selection, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions.

In some aspects, the UE includes means for receiving configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and/or means for monitoring, based at least in part on the configuration information, PDCCH for a first set of CORESETs and a second set of CORESETs that at least partially overlap with each other in time, wherein PDCCH monitoring for the first set of CORESETs is based at least in part on a first spatial QCL property and PDCCH monitoring for the second set of CORESETs is based at least in part on a second spatial QCL property different than the first spatial QCL property. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for selecting the first set of CORESETs from a plurality of CORESETs based at least in part on a priority rule; and/or means for selecting the second set of CORESETs from the plurality of CORESETs, excluding the first set of CORESETs, based at least in part on the priority rule.

In some aspects, the UE includes means for determining the first spatial QCL property based at least in part on the first set of CORESETs; and/or means for determining the second spatial QCL property based at least in part on the second set of CORESETs.

In some aspects, the UE includes means for selecting a CORESET of the first set of CORESETs based at least in part on a priority rule; and/or means for identifying a remainder of CORESETs of the first set of CORESETs based at least in part on the remainder of CORESETs having a same spatial QCL property as the selected CORESET.

In some aspects, the UE includes means for selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and/or means for selecting the second set of CORESETs to include the other CORESET.

In some aspects, the UE includes means for selecting the first set of CORESETs to include the first CORESET based at least in part on the first CORESET including the first PDCCH repetition; and/or means for selecting the second set of CORESETs to include the second CORESET based at least in part on the second CORESET including the second PDCCH repetition.

In some aspects, the UE includes means for transmitting information indicating that the UE is capable of contemporaneous communication using at least two spatial QCL properties, wherein the configuration information is based at least in part on the information indicating that the UE is capable of contemporaneous communication using at least two spatial QCL properties.

In some aspects, the UE includes means for receiving configuration information indicating PDCCH repetition indicating a link between a first CORESET and a second CORESET, wherein the second CORESET is included in a plurality of CORESETs having at least two different spatial QCL properties that are associated with overlapping monitoring occasions; and/or means for monitoring PDCCH using a selected spatial QCL property corresponding to a selected CORESET of the plurality of CORESETs, wherein the selected CORESET is selected based at least in part on a priority rule that is based at least in part on the link between the first CORESET and the second CORESET. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and/or means for transmitting a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for selecting the first set of CORESETs from a plurality of CORESETs based at least in part on a priority rule; and/or means for selecting the second set of CORESETs from the plurality of CORESETs, excluding the first set of CORESETs, based at least in part on the priority rule.

In some aspects, the base station includes means for determining the first spatial QCL property based at least in part on the first set of CORESETs; and/or means for determining the second spatial QCL property based at least in part on the second set of CORESETs.

In some aspects, the base station includes means for selecting a CORESET of the first set of CORESETs based at least in part on a priority rule; and/or means for identifying a remainder of CORESETs of the first set of CORESETs based at least in part on the remainder of CORESETs having a same spatial QCL property as the selected CORESET.

In some aspects, the base station includes means for selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and/or means for selecting the second set of CORESETs to include the other CORESET.

In some aspects, the base station includes means for selecting the first set of CORESETs to include the first CORESET based at least in part on the first CORESET including the first PDCCH repetition; and/or means for selecting the second set of CORESETs to include the second CORESET based at least in part on the second CORESET including the second PDCCH repetition.

In some aspects, the base station includes means for receiving information indicating that the UE is capable of contemporaneous communication using at least two spatial QCL properties, wherein the configuration information is based at least in part on the information indicating that the UE is capable of contemporaneous communication using at least two spatial QCL properties.

In some aspects, the base station includes means for transmitting, to a UE, configuration information indicating PDCCH repetition indicating a link between a first CORESET and a second CORESET, wherein the second CORESET is included in a plurality of CORESETs having at least two different spatial QCL properties that are associated with overlapping monitoring occasions; and/or means for transmitting a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

Figure 3:
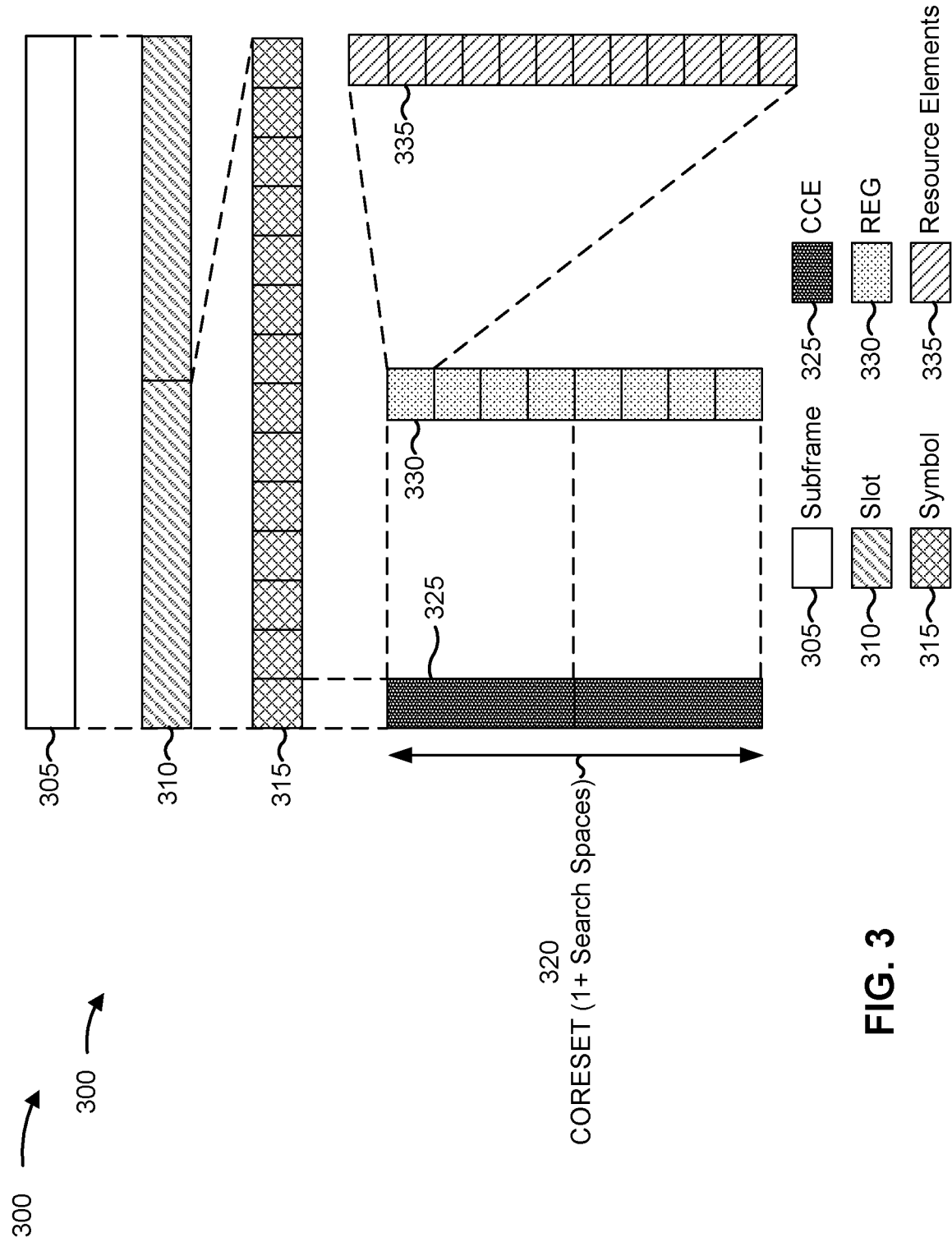
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a CORESET 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
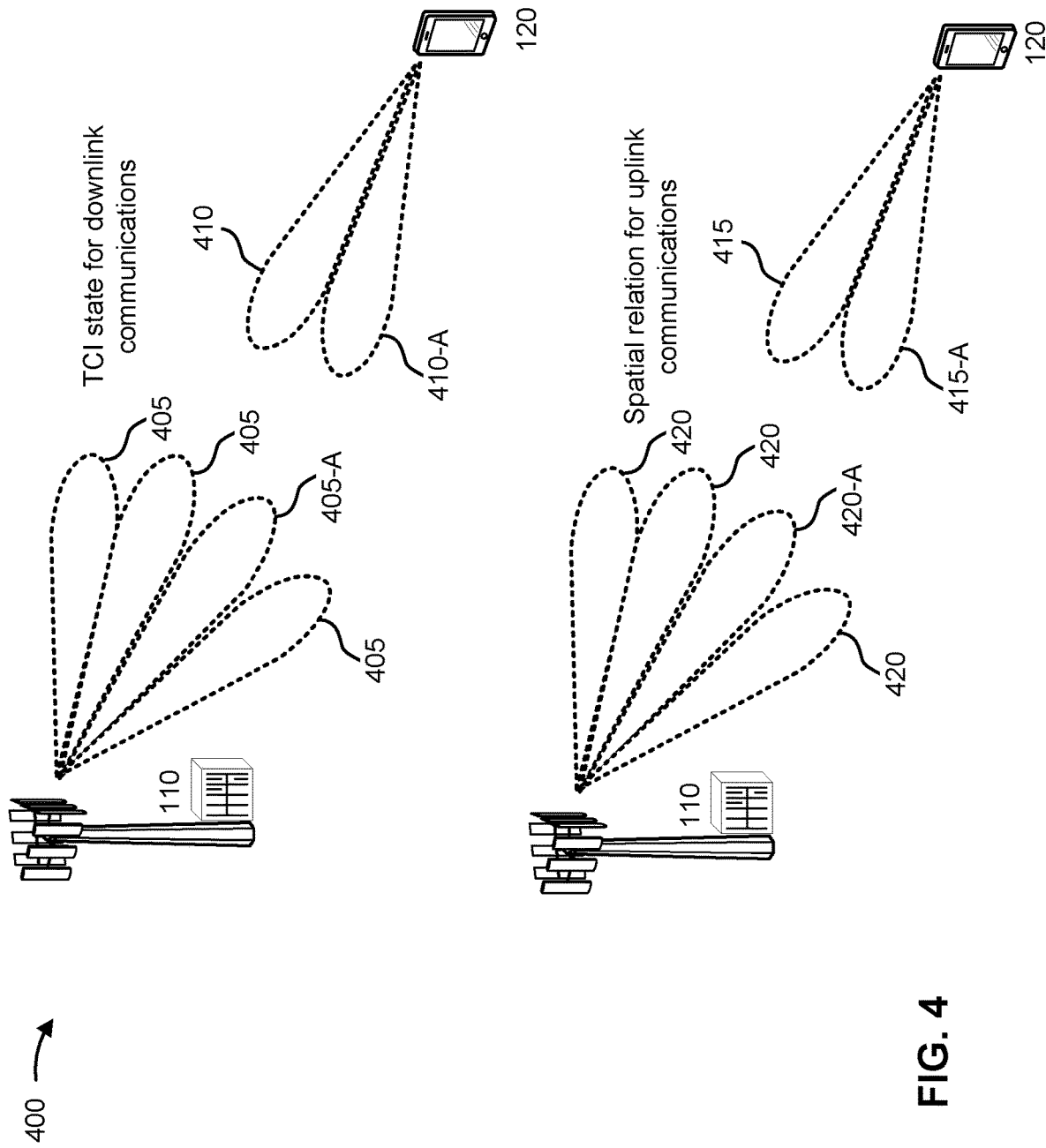
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus determine and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 405 may be associated with a synchronization signal block (SSB), and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a CORESET. The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus obtain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

A base station may transmit a PDCCH to a UE. For example, the base station may transmit the PDCCH in a PDCCH candidate. The PDCCH candidate may be included in a search space, which may be included in or associated with a search space set. The UE may attempt to decode a PDCCH (referred to herein as monitoring a PDCCH) in one or more monitoring occasions of the search space set. The one or more monitoring occasions may correspond to one or more PDCCH candidates of the search space set.

A base station may configure PDCCH repetition to improve reliability of PDCCH transmission. Each repetition of a PDCCH repetition configuration may be in a PDCCH candidate. Two or more PDCCH candidates may be linked for potential repetition of the same DCI. For example, two PDCCH candidates in different SS sets (associated with corresponding CORESETs) may be linked together for PDCCH repetition (e.g., a search space set with index 2 may be linked with a search space set with index 4). If the two linked search space sets are associated with different CORESETs, given that TCI state is configured and activated per CORESET, different PDCCH repetitions can use different TCI states, thus enabling beam diversity and multiple transmit receive point (multi-TRP) diversity. Each search space set may have different monitoring occasions (MOs) within a slot and across slots. For PDCCH repetition, an MO of a first search space set may be linked with an MO of a second search space set. The mechanism for linking MOs of the two SS sets can be rule-based or configuration-based (such as based at least in part on a parameter searchSpaceLinking). Depending on the search space set configuration (with regard to an MO), PDCCH repetition can be in a time-division multiplexing manner (where PDCCH repetitions occupy different time resources), a frequency division multiplexing manner (where PDCCH repetitions occupy different frequency resources), or both.

A UE and a base station may communicate with each other using beamformed communications. For example, on the downlink, the base station may transmit a communication using a transmit beam and the UE may receive the communication using a receive beam. On the uplink, the UE may transmit a communication using a transmit beam and the base station may receive the communication using a receive beam. As mentioned above, a beam for a communication may be indicated based at least in part on a TCI state, which may indicate a QCL relationship and a source reference signal from which a QCL property is to be derived. One example of a QCL property is a spatial QCL parameter (e.g., a spatial receive parameter or a spatial transmit parameter), which may be referred to as QCL Type D or a QCL Type D parameter.

A UE may be capable of receiving a given number of beams contemporaneously. As one example, a UE may be capable of receiving a communication using a single beam at a given time. As another example, a UE may be capable of receiving one or more communications using two or more different beams at a given time. In some cases, a UE may be configured to receive simultaneous communications via more beams than the UE is capable of handling, such as multiple PDCCHs with different QCL properties in a given serving cell or on multiple serving cells on a same frequency band for carrier aggregation (CA) operation. In such a case, the UE may apply a priority rule to select a CORESET corresponding to a PDCCH of the multiple PDCCHs. For example, the UE may select the CORESET, and may monitor PDCCH only in the selected CORESET and any other CORESET that has a same QCL Type D property as the selected CORESET. In one example, the priority rule may be a search space type first (where a common search space has higher priority than a UE-specific search space), carrier index second (where a lowest component carrier or serving cell index has a highest priority), search space set index third (wherein a lowest search space set index has a highest priority) priority rule.

In some cases, frequency division multiplexed PDCCH repetitions (or partially overlapping PDCCH repetitions in the time domain) associated with linked SS sets may be transmitted in CORESETs that have different TCI states (e.g., different QCL type D properties). In such a case, a baseline QCL prioritization rule (such as the priority rule indicating that PDCCH is monitored only in a selected CORESET and in any other CORESET that has the same QCL Type D properties as the selected CORESET) prevents both PDCCH repetitions from being monitored due to the PDCCH repetitions having different TCI states and overlapping in time, which reduces the effectiveness of configuring frequency division multiplexed PDCCH repetition. Frequency division multiplexed PDCCH repetition may provide lower latency than time division multiplexed PDCCH repetition.

Furthermore, in the case of time division multiplexed PDCCH repetition when the UE is not capable of receiving two beams simultaneously, the baseline priority rule does not take into account PDCCH repetition when determining a QCL Type D property for PDCCH monitoring. Thus, the effectiveness of time division multiplexed PDCCH repetition may be reduced, since the UE may not select the QCL Type D properties of a first PDCCH repetition and of a second PDCCH repetition, meaning that the UE may receive only one (or none) of the first PDCCH repetition and the second PDCCH repetition. Thus, the effectiveness of PDCCH repetition may be reduced and communication resources of the base station used for configuring and performing PDCCH repetition may be expended for little benefit.

Some techniques and apparatuses described herein provide for a UE that is capable of supporting multiple TCI states simultaneously to select two or more TCI states for a plurality of overlapped MOs. For example, if a UE is configured with PDCCH repetition such that an MO of a first linked search space set associated with a first CORESET with a first TCI state overlaps with an MO of a second linked search space set associated with a second CORESET with a second TCI state, the UE may determine two QCL Type D properties for PDCCH monitoring in overlapping PDCCH monitoring occasions across multiple CORESETS (in the same component carrier (CC) or in different CCs for intra-band carrier aggregation), if the UE indicates a capability for receiving or using multiple QCL Type D properties simultaneously. Various techniques described herein provide priority rules for selection of the QCL Type D properties. Thus, the usage of PDCCH repetition in a frequency division multiplexed fashion, where two or more PDCCH repetitions are associated with different TCI states (and thus different QCL Type D properties), is enabled for a UE that supports simultaneous reception using two or more different TCI states. In this way, latency associated with PDCCH repetition can be lowered and efficiency of resource usage is improved.

Some techniques and apparatuses described herein enable a UE to determine a QCL Type D property (e.g., a TCI state) for overlapping PDCCH monitoring occasions across multiple CORESETs (in the same CC or in different CCs for intra-band CA) based at least in part on a PDCCH repetition configuration that links a first PDCCH repetition in an MO not belonging to the overlapping PDCCH monitoring occasions and a second PDCCH repetition in an MO belonging to the overlapping PDCCH monitoring occasions. For example, the MO of the second PDCCH repetition being configured for PDCCH repetition may cause the UE to prioritize the CORESET associated with the second PDCCH repetition when determining a QCL Type D property for overlapping PDCCH monitoring occasions across multiple CORESETs. In some aspects, the above techniques may be implemented in a priority rule for CORESET selection, as described in more detail elsewhere herein. In this way, efficacy of PDCCH repetition is improved, which improves robustness of PDCCH transmission, thereby improving utilization of communication resources of the UE and the base station.

Figure 5:
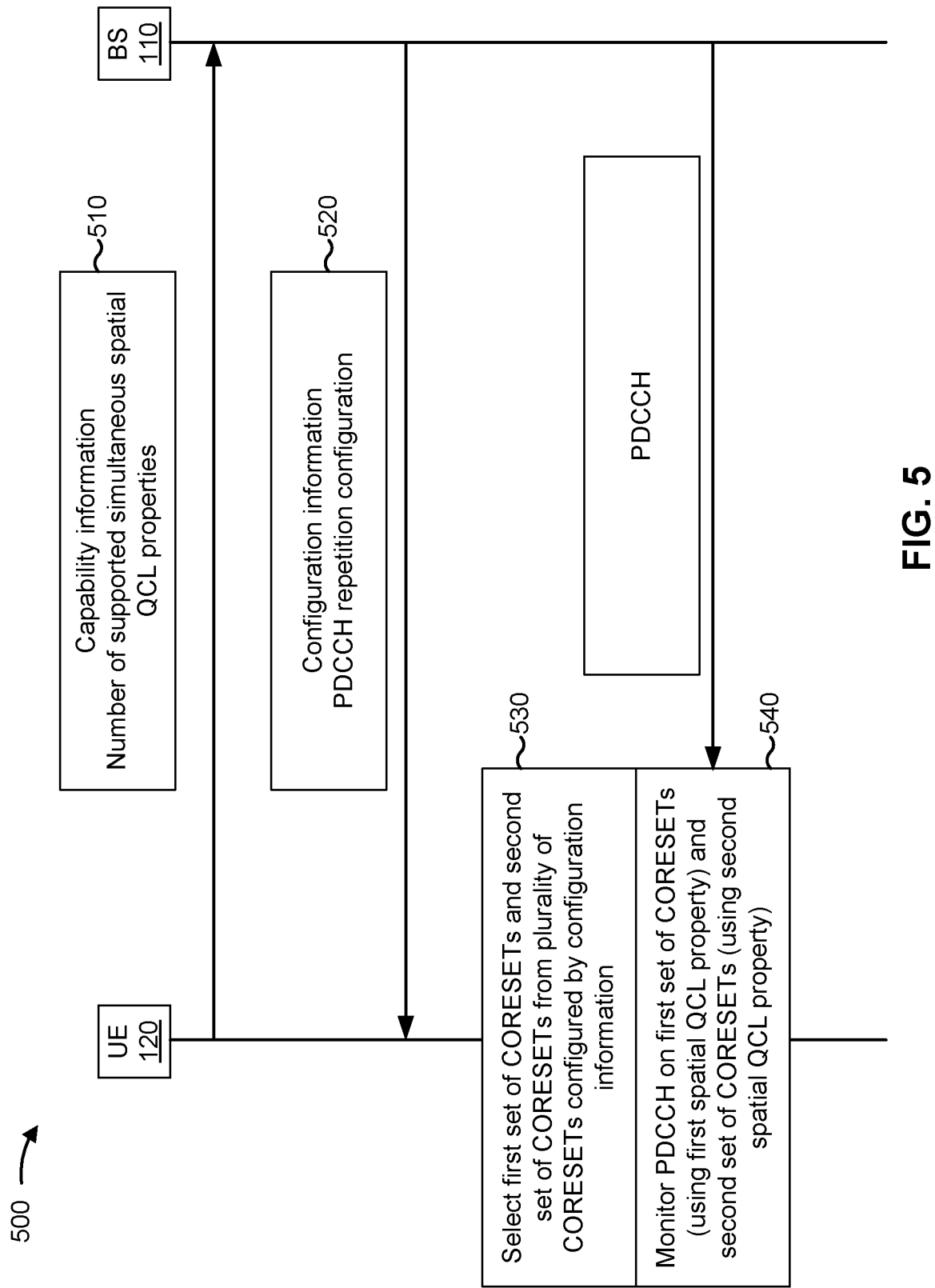
FIG. 5 is a diagram illustrating an example of signaling associated with reception of physical downlink control channels (PDCCHs) using multiple transmission configuration indicator (TCI) states, in accordance with the present disclosure.

FIG. 5 is a diagram illustrating an example 500 of signaling associated with reception of PDCCHs using multiple TCI states, in accordance with the present disclosure. As shown, example 500 includes a UE 120 and a BS 110. In some aspects, the BS 110 may be associated with a plurality of TRPs, a plurality of remote radio heads, or the like.

As shown in FIG. 5, and by reference number 510, the UE 120 may transmit capability information. The capability information may indicate one or more capabilities of the UE 120. In example 500, the capability information may indicate a number of supported simultaneous spatial QCL properties for the UE 120. For example, the capability information may indicate that the UE 120 is capable of contemporaneous communication using at least two spatial QCL properties. For example, the capability information may indicate a number of QCL Type D properties that the UE 120 can use for simultaneous reception of communications (e.g., PDCCHs). "Spatial QCL property," "QCL Type D property," "QCL property," and "QCL parameter" are used interchangeably herein.

As shown by reference number 520, the BS 110 may transmit, to the UE 120, configuration information. For example, the BS 110 may transmit the configuration information via RRC signaling, medium access control (MAC) signaling, DCI, or a combination thereof. The configuration information may configure the UE 120 for PDCCH repetition (e.g., may include a PDCCH repetition configuration). For example, the configuration information may indicate that a first MO is linked with a second MO for PDCCH repetition (such as based at least in part on a parameter searchSpaceLinking), meaning that the first MO may include a first CORESET including a first PDCCH repetition and the second MO may include a second CORESET including a second PDCCH repetition. In some aspects, the configuration information may link two or more MOs for PDCCH repetition. Additionally, or alternatively, the configuration information may link two or more search space sets associated with corresponding CORESETs. The PDCCH repetition can be in a time division multiplexed manner, a frequency division multiplexed matter, or a combination thereof. In some aspects, the first CORESET and the second CORESET may at least partially overlap in time. For example, an MO associated with a first linked search space associated with the first CORESET may at least partially overlap, in time, with an MO associated with a second linked search space associated with the second CORESET.

The configuration information may also indicate one or more TCI states for a plurality of CORESETs. For example, the configuration information may configure a CORESET, and may indicate a TCI state (which may indicate a spatial QCL property, such as a QCL Type D property, and a source reference signal) for the CORESET. In some aspects, the first CORESET described above may have a first TCI state and the second CORESET described above may have a second TCI state different than the first TCI state. In some aspects, the one or more TCI states indicated for the plurality of CORESETs may be based at least in part on the configuration information. For example, the BS 110 may configure the plurality of CORESETs such that a capability of the UE 120 for contemporaneous communication using at least two spatial QCL properties (e.g., at least two different TCI states) is not violated. As another example, the BS 110 may configure a PDCCH repetition such that the UE 120's selection of spatial QCL properties for reception is compatible with the PDCCH repetition (e.g., so that the UE 120 can receive a first PDCCH repetition and a second PDCCH repetition using the same spatial QCL property or using at most a number of spatial QCL properties supported by the UE 120).

As shown by reference number 530, the UE 120 may select a first set of CORESETs and a second set of CORESETs from the plurality of CORESETs configured by the configuration information. For example, in example 500, the UE 120 supports simultaneous reception using 2 TCI states. Therefore, the UE 120 may select a first set of CORESETs and a second set of CORESETs. The first set of CORESETs may be associated with a first TCI state (e.g., a first spatial QCL parameter) and the second set of CORESETs may be associated with a second TCI state (e.g., a second spatial QCL parameter). In some aspects, at least part of the first set of CORESETs may overlap with at least part of the second set of CORESETs in time.

The UE 120 may select the first set of CORESETs and the second set of CORESETs based at least in part on a priority rule. For example, the priority rule may indicate how the UE 120 is to select a first selected CORESET and a second selected CORESET (which may be different than, or may be the same as, the first CORESET and the second CORESET described in connection with reference number 310) from the plurality of CORESETs. The UE 120 may determine a first spatial QCL property (e.g., a QCL Type D property) associated with the first selected CORESET based at least in part on a TCI state associated with the first selected CORESET, and may identify the first set of CORESETs based at least in part on each CORESET, of the first set of CORESETs, being associated with the first spatial QCL property. Similarly, the UE 120 may determine a second spatial QCL property associated with the second selected CORESET based at least in part on a TCI state associated with the second selected CORESET, and may identify the second set of CORESETs based at least in part on each CORESET, of the second set of CORESETs, being associated with the second spatial QCL property.

The priority rule may indicate one or more rules for selecting a CORESET, from a plurality of CORESETs configured for the UE 120, for reception using a spatial QCL property associated with the CORESET. In some aspects, the priority rule may be defined herein as an "X first, Y second" priority rule. X and Y may define conditions for selection of a CORESET. If the UE 120 is choosing between a first CORESET and a second CORESET using an "X first, Y second" priority rule, then the UE 120 may first determine whether the condition X indicates to select the first CORESET or the second CORESET. If the first CORESET and the second CORESET are not distinguishable by the condition X, then the UE 120 may next determine whether the condition Y indicates to select the first CORESET or the second CORESET.

In some aspects, the UE 120 may select the first set of CORESETs and the second set of CORESETs irrespective of a PDCCH repetition configuration indicated by the configuration information. For example, the priority rule may not take into account the PDCCH repetition configuration. In some aspects, the priority rule may be a search space type first, carrier index second, search space set index third priority rule. For example, the UE 120 may first select a CORESET included in a common search space over a CORESET included in a UE-specific search space. If all of the plurality of CORESETs are included in UE-specific search spaces or all of the plurality of CORESETs are included in common search spaces, then the UE 120 may select a CORESET with a lowest CC index or a lowest serving cell index. If all of the plurality of CORESETs are associated with the same CC index or the same serving cell index, then the UE 120 may select a CORESET with a lowest SS set index. In this way, the UE 120 may select a first selected CORESET. The UE 120 may then determine the first set of CORESETs as all CORESETs associated with a same spatial QCL property as the first selected CORESET. Then, the UE 120 may determine the second set of CORESETs by applying the priority rule for a remainder of CORESETs, of the plurality of CORESETs, other than the first set of CORESETs. It should be noted that the above approach for selecting the first set of CORESETs and the second set of CORESETs may, or may not, lead to a CORESET associated with PDCCH repetition being selected as included in the first set of CORESETs or the second set of CORESETs. For example, whether one or more overlapping PDCCH repetitions are monitored or not may depend on the spatial QCL parameters of the first set of CORESETs or the second set of CORESETs.

In some aspects, the UE 120 may select the first set of CORESETs and the second set of CORESETs based at least in part on a priority rule and a PDCCH repetition configuration. For example, the UE 120 may select the first set of CORESETs based at least in part on a search space type first, carrier index second, search space set index third priority rule. The UE 120 may determine a first spatial QCL property associated with the first set of CORESETs. If there are overlapping (in time) PDCCH repetitions such that a first repetition of the PDCCH repetitions is in the first set of CORESETs (e.g., if the first repetition is associated with a CORESET with the spatial QCL property, either the first selected CORESET or another CORESET with the same beam), then the UE 120 may determine a second spatial QCL parameter as the spatial QCL parameter of the CORESET associated with the second repetition. If there are multiple pairs of first/second repetitions as described above (that is, if there are a plurality of CORESETs in the first set of CORESETs and each CORESET of the plurality of CORESETs in the first set of CORESETs is linked with a respective second CORESET (e.g., one CORESETs in the first set of CORESETs per second CORESET)), then the UE 120 may apply a priority rule for determination of the second spatial QCL property (e.g., such as based at least in part on CSS/USS, based at least in part on search space set index of the first/second PDCCH repetitions, based at least in part on a CC index in which PDCCH repetition is configured, based at least in part on a CORESET identifier of the first/second PDCCH repetition, or the like). For example, the priority rule used to select the first set of CORESETs may be referred to as a first priority rule, and the priority rule used to determine the second spatial parameter (and thus to select the second set of CORESETs) may be referred to as a second priority rule. In some aspects, the second priority rule may be a search space type first, carrier index second, search space set index third priority rule. In this way, the UE 120 may select the first set of CORESETs from the plurality of CORESETs based at least in part on a priority rule, wherein the first set of CORESETs includes a particular CORESET in which there is a PDCCH repetition linked with another PDCCH repetition in another CORESET that is at least partially overlapped with the first CORESET, based at least in part on PDCCH repetition. The UE 120 may select the second set of CORESETs to include the other CORESET. Thus, the UE 120 may take PDCCH repetition into account without necessarily selecting a pair of PDCCH repetitions overlapping MOs to be monitored.

In some aspects, the UE 120 may select the first set of CORESETs to include a first CORESET associated with a first PDCCH repetition, and the second set of CORESETs to include a second CORESET associated with a second PDCCH repetition. For example, the UE 120 may select the first set of CORESETs to include the first CORESET based at least in part on the first CORESET including the first PDCCH repetition and based at least in part on each CORESET of the first set of CORESETs having a same spatial QCL property as the first CORESET. The UE 120 may select the second set of CORESETs to include the second CORESET based at least in part on the second CORESET including the second PDCCH repetition and/or based at least in part on each CORESET of the second set of CORESETs having a same spatial QCL property as the second CORESET. If multiple pairs of PDCCH repetitions are configured, then the UE 120 may apply a priority rule for selection of the first set of CORESETs and/or the second set of CORESETs and/or determination of the corresponding spatial QCL properties (e.g. such as based at least in part on CSS/USS, based at least in part on a search space set index of the first/second PDCCH repetitions, based at least in part on a CC index in which PDCCH repetition is configured, based at least in part on a CORESET identifier of the first/second PDCCH repetition, or the like). Thus, the UE 120 may ensure that at least one pair of PDCCH repetitions with overlapping MOs are monitored.

Figure 6:
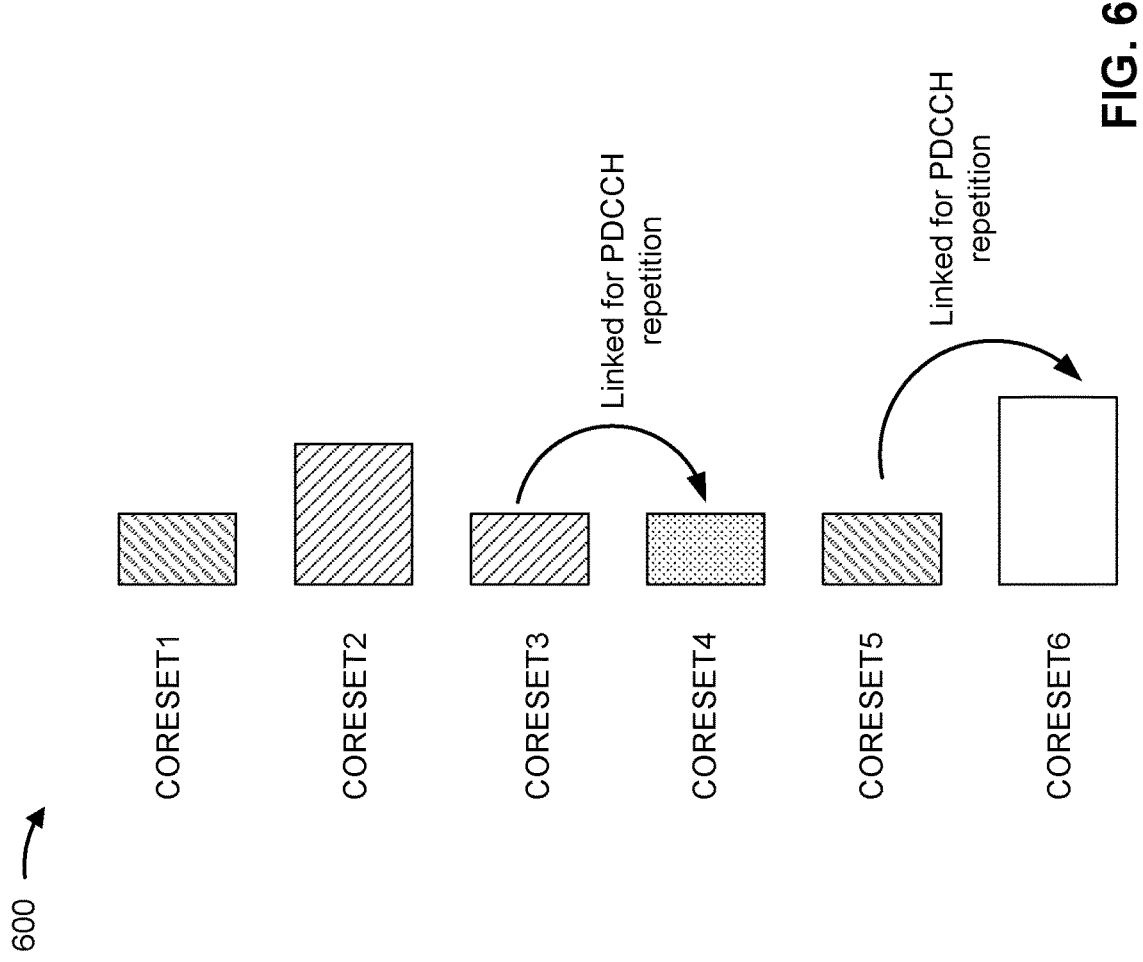
FIG. 6 is a diagram illustrating an example of determination of a first set of control resource sets (CORESETs) and a second set of CORESETs, in accordance with the present disclosure.

FIG. 6 is a diagram illustrating an example 600 of determination of a first set of CORESETs and a second set of CORESETs, in accordance with the present disclosure. Example 600 shows six CORESETs. Spatial QCL parameters of each CORESET are shown by hatching or fill of different types. Furthermore, CORESET3 is associated with CORESET4 based at least in part on CORESET3 carrying a first PDCCH repetition and CORESET4 carrying a second PDCCH repetition. Also, CORESET 5 is associated with CORESET6 based at least in part on CORESET 5 carrying a first PDCCH repetition and CORESET6 carrying a second PDCCH repetition.

CORESET1 carries DCI in a common search space (CSS) set with an index of 2 in CC 0. CORESET2 carries DCI in a CSS set with an index of 2 in CC 1. CORESET3 carries DCI in a UE-specific search space (USS) set with an index of 1 in CC 0. CORESET4 carries DCI in a USS set with an index of 3 in CC 0. CORESET5 carries DCI in a USS set with an index of 2 in CC 1. CORESET6 carries DCI in a USS set with an index of 3 in CC 1.

If a search space type first, carrier index second, search space set index third priority rule were applied to select a single spatial QCL property (e.g., corresponding to a single CORESET), then the order of selection may be CORESET1, CORESET2, CORESET3, CORESET4, CORESET5, then CORESET6.

If a search space type first, carrier index second, search space set index third priority rule were applied to select a first set of CORESETs, then to a remainder of the plurality of CORESETs to select a second set of CORESETs, then the UE 120 may select CORESET1 as a first selected CORESET. The UE 120 may identify CORESET1 and CORESET5 as the first set of CORESETs based at least in part on the spatial QCL property associated with CORESET1 and CORESET5. The UE 120 may select CORESET2 as a second selected CORESET from remaining CORESETs (e.g., CORESET2, CORESET3, CORESET4, CORESET6). The UE 120 may identify CORESET2 and CORESET3 as the second set of CORESETs based at least in part on the spatial QCL property associated with CORESET2 and CORESET3. The UE 120 may monitor PDCCHs on CORESET1, CORESET2, CORESET3, and CORESET5.

If a search space type first, carrier index second, search space set index third priority rule were applied to select a first set of CORESETs, then a second set of CORESETs is selected based at least in part on a PDCCH repetition, then the UE 120 may select CORESET1 as a first selected CORESET. The UE 120 may identify CORESET1 and CORESET5 as the first set of CORESETs based at least in part on the spatial QCL property associated with CORESET1 and CORESET5. The UE 120 may select CORESET6 as a second selected CORESET based at least in part on CORESET6 being associated with PDCCH repetition with CORESET5. The UE 120 may monitor PDCCHs on CORESET1, CORESET5, and CORESET6.

If the UE 120 selects the first set of CORESETs and the second set of CORESETs based at least in part on a PDCCH repetition, then the UE 120 may select CORESET3 as a first selected CORESET. Since CORESET3 and CORESET5 are associated with PDCCH repetitions, the UE 120 may resolve this ambiguity using a priority rule, such as a search space type first, carrier index second, search space set index third priority rule. The UE 120 may identify CORESET2 and CORESET3 as the first set of CORESETs based at least in part on the spatial QCL property associated with CORESET2 and CORESET3. The UE 120 may select CORESET4 as a second selected CORESET based at least in part on CORESET3 being associated with PDCCH repetition with CORESET4. The second set of CORESETs includes only CORESET4 based at least in part on CORESET4 having a unique spatial QCL parameter (with regard to the six CORESETs of FIG. 6). The UE 120 may monitor PDCCHs on CORESET2, CORESET3, and CORESET4.

Returning to FIG. 5, as shown by reference number 540, the UE 120 may monitor PDCCH on the first set of CORESETs and the second set of CORESETs. For example, the UE 120 may generate receive beams using the first spatial QCL property and the second spatial QCL property, and may monitor MOs corresponding to each CORESET of the first set of CORESETs and the second set of CORESETs. The BS 110 may transmit a plurality of PDCCHs, potentially including one or more PDCCHs on the first set of CORESETs and/or the second set of CORESETs, in accordance with respective spatial QCL properties of the plurality of PDCCHs. In this way, the UE 120 may determine a set of CORESETS to monitor based at least in part on a capability of the UE 120 for contemporaneous communication on a plurality of beams. Thus, frequency division multiplexed PDCCH repetition is improved, which reduces latency associated with PDCCH repetition and improves versatility of PDCCH scheduling.

As indicated above, FIGS. 5 and 6 are provided as examples. Other examples may differ from what is described with regard to FIGS. 5 and 6.

Figure 7:
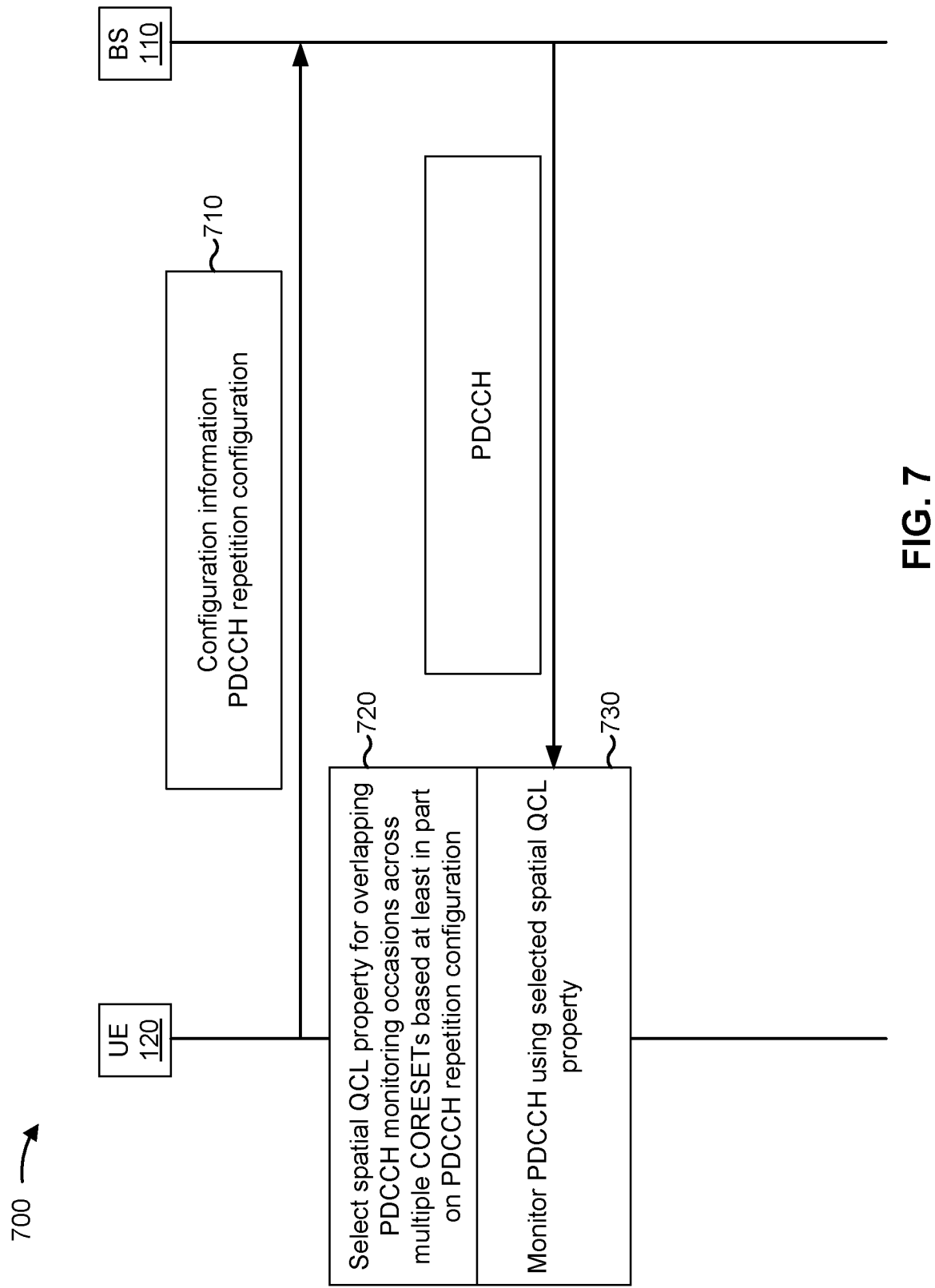
FIG. 7 is a diagram illustrating an example of signaling associated with determination of a spatial quasi-colocation (QCL) property in overlapping PDCCH monitoring occasions across multiple CORESETs, in accordance with the present disclosure.

FIG. 7 is a diagram illustrating an example 700 of signaling associated with determination of a spatial QCL property in overlapping PDCCH monitoring occasions across multiple CORESETs, in accordance with the present disclosure. As shown, example 700 includes a UE 120 and a BS 110. In some aspects, the BS 110 may be associated with a plurality of TRPs, a plurality of remote radio heads, or the like.

As shown in FIG. 7, and by reference number 710, the BS 110 may transmit configuration information to the UE 120. For example, the BS 110 may transmit the configuration information via RRC signaling, MAC signaling, DCI, or a combination thereof. The configuration information may configure the UE 120 for PDCCH repetition. For example, the configuration information may indicate that a first MO is linked with a second MO for PDCCH repetition, meaning that the first MO may include a first CORESET including a first PDCCH repetition and the second MO may include a second CORESET including a second PDCCH repetition. In some aspects, the configuration information may link two or more MOs for PDCCH repetition. Additionally, or alternatively, the configuration information may link two or more search space sets associated with corresponding CORESETs. The PDCCH repetition can be in a time division multiplexed manner, a frequency division multiplexed matter, or a combination thereof. In some aspects, a CORESET, of the first CORESET and the second CORESET, may at least partially overlap with one or more other CORESETs, such as in time or in frequency. For example, an MO associated with a first linked search space associated with the first CORESET may at least partially overlap with an MO of another CORESET. In some aspects, the first CORESET and the second CORESET may be in the same CC. In some aspects, the first CORESET and the second CORESET may be in different CCs (such as for intra-band CA).

As shown by reference number 720, the UE 120 may select a spatial QCL property (or may select a CORESET associated with the spatial QCL property) for overlapping PDCCH monitoring occasions across multiple CORESETs based at least in part on the PDCCH repetition configuration. For example, the PDCCH repetition configuration may link a first PDCCH repetition in an MO that does not belong to the overlapping PDCCH MOs and a second PDCCH repetition in an MO belonging to the overlapping PDCCH MOs. The UE 120 may select the spatial QCL property based at least in part on a priority rule that is based at least in part on a link between the first CORESET and the second CORESET (e.g., a link between PDCCH repetitions of the first CORESET and the second CORESET, between MOs of the first CORESET and the second CORESET, or the like). For example, the fact that the MO of the second repetition (included in the second CORESET) is configured for PDCCH repetition may cause the UE 120 to prioritize the CORESET in which the second PDCCH repetition exists when determining a spatial QCL property in the overlapping PDCCH monitoring occasions (that overlap the second PDCCH repetition) across multiple CORESETS.

In some aspects, the priority rule may prioritize PDCCH repetition linkage over one or more other conditions for selection of the selected CORESET. For example, the priority rule may include multiple conditions, and may include PDCCH repetition as one of the multiple conditions. As just one example, the priority rule may be a search space type first, PDCCH repetition linkage second, carrier index third, search space set index fourth priority rule. In this case, given a plurality of CORESETs with overlapping MOs, the UE 120 may select a CORESET associated with a CSS before selecting any other CORESET. If no CORESET is associated with a CSS, then the UE 120 may select a CORESET associated with a PDCCH repetition linkage. If no CORESET is associated with a PDCCH repetition linkage, the UE 120 may fall back to the third and/or fourth parts of the priority rule.

In some aspects, the priority rule may prioritize PDCCH repetition linkage over all other conditions for selection of the selected CORESET. For example, the priority rule may be a PDCCH repetition linkage first, search space type second, carrier index third, search space set index fourth priority rule. In this case, given a plurality of CORESETs with overlapping MOs, the UE 120 may select a CORESET associated with a PDCCH repetition linkage before selecting any other CORESET. If no CORESET is associated with a PDCCH repetition linkage, the UE 120 may fall back to the second, third, and/or fourth parts of the priority rule.

Figure 8:
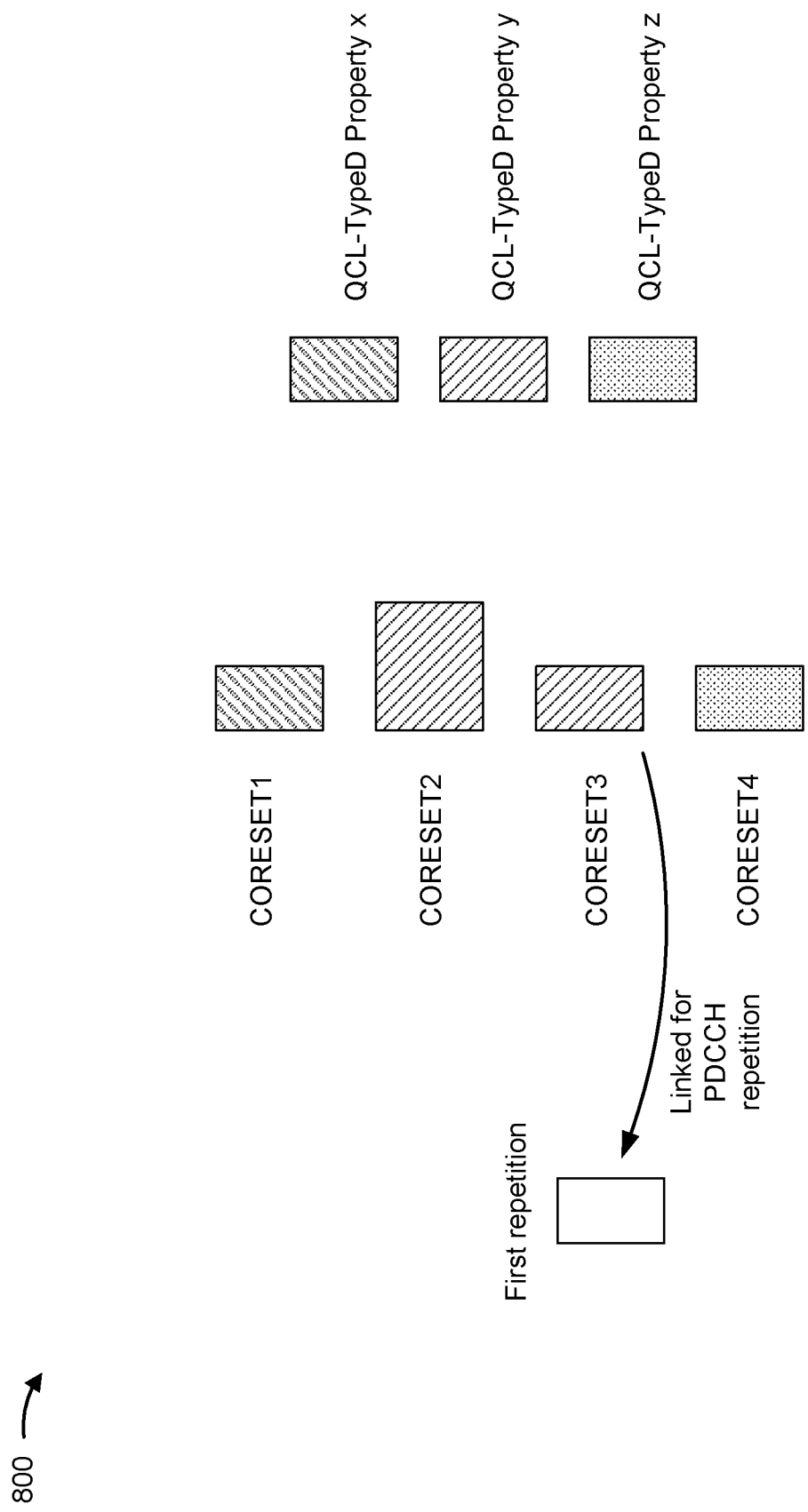
FIG. 8 is a diagram illustrating an example associated with the signaling described with regard to FIG. 7, in accordance with the present disclosure.

FIG. 8 is a diagram illustrating an example 800 associated with the signaling described with regard to FIG. 7, in accordance with the present disclosure. FIG. 8 shows five CORESETs: a first repetition of a PDCCH repetition configuration, and four CORESETs associated with PDCCH candidates in overlapped PDCCH monitoring occasions in two cells (e.g., CC0 and CC1 in the same band). Spatial QCL parameters of each CORESET are shown by hatching or fill of different types. Furthermore, CORESET3 is associated with the CORESET that carries the first PDCCH repetition based at least in part on the PDCCH repetition configuration (e.g., based at least in part on the configuration information shown by reference number 710).

As shown, CORESET1 carries DCI in a CSS set with an index of 2 in CC 0. CORESET2 carries DCI in a CSS set with an index of 2 in CC 1. CORESET3 carries DCI in a USS set with an index of 1 in CC 0. CORESET4 carries DCI in a USS set with an index of 1 in CC 1.

If a search space type first, carrier index second, search space set index third priority rule were applied to select a single spatial QCL property (e.g., corresponding to a single CORESET), then the order of selection may be CORESET1, CORESET2, CORESET3, then CORESET4. In this case, by failing to take into account the PDCCH repetition configuration, the UE 120 may thus not monitor the second repetition of the PDCCH repetition configuration in CORESET3.

If the priority rule takes into account the PDCCH repetition configuration (e.g., over one or more other conditions or over all other conditions), then the UE 120 may select CORESET3 as the selected CORESET (e.g., may determine the spatial QCL parameter corresponding to CORESET3). Thus, the UE 120 may select CORESET2 and CORESET3 as the second set of CORESETs for PDCCH monitoring.

Returning to FIG. 7, as shown by reference number 730, the UE 120 may monitor PDCCH using a selected spatial QCL property corresponding to the selected CORESET. For example, the UE 120 may generate a receive beam using the selected spatial QCL property, and may monitor a PDCCH based at least in part on the receive beam. The BS 110 may transmit a plurality of PDCCHs, potentially including a PDCCH on the selected CORESET, in accordance with respective spatial QCL properties of the plurality of PDCCHs. In this way, compatibility with PDCCH repetition configuration is improved and the likelihood of monitoring PDCCH repetitions is improved, which improves efficiency of network resource usage and robustness of PDCCH communication.

As indicated above, FIGS. 7 and 8 are provided as examples. Other examples may differ from what is described with regard to FIGS. 7 and 8.

Figure 9:
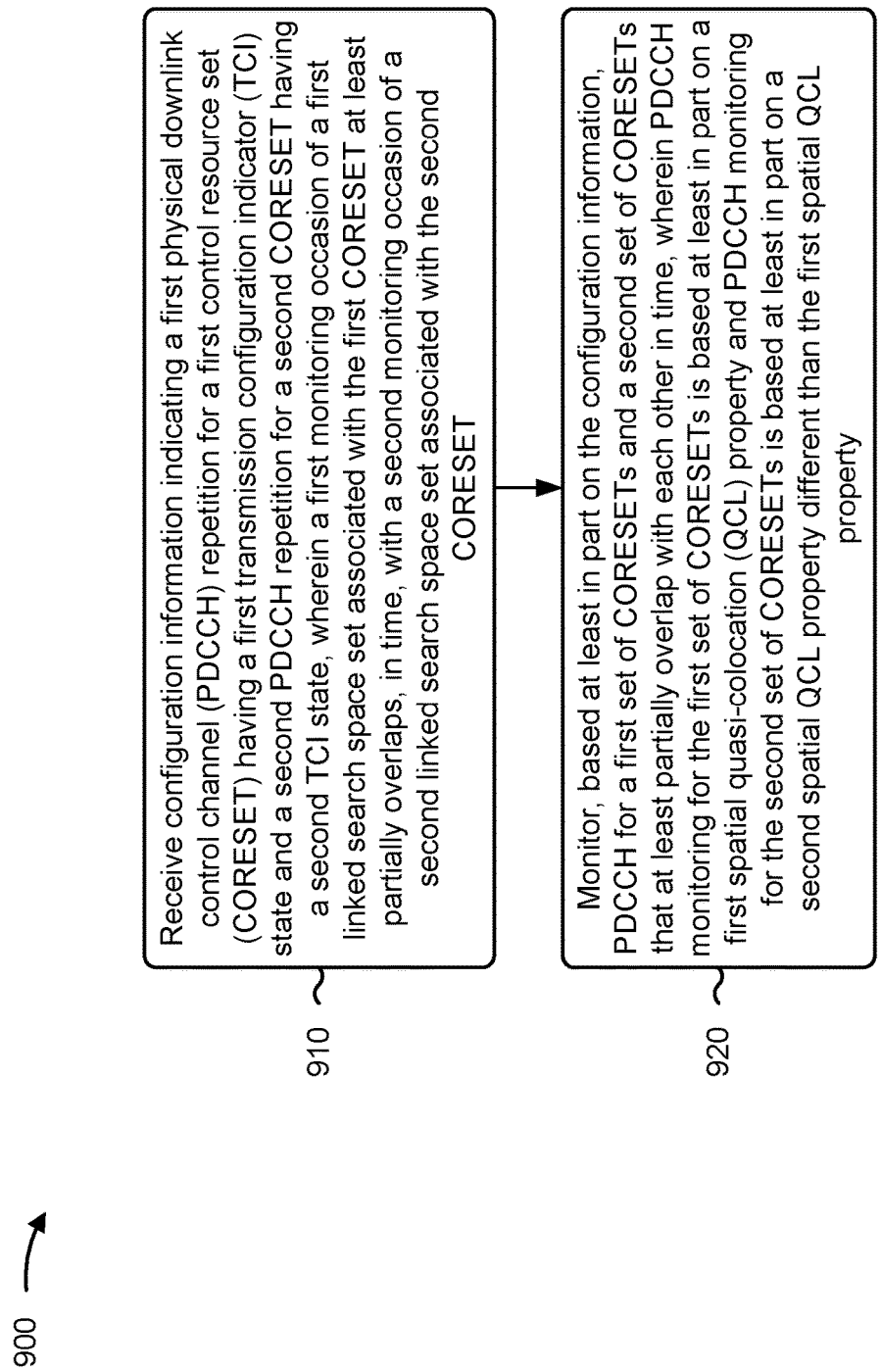
FIGS. 9-12 are diagrams illustrating example processes associated with techniques described herein, in accordance with the present disclosure.

FIG. 9 is a diagram illustrating an example process 900 performed, for example, by a UE, in accordance with the present disclosure. Example process 900 is an example where the UE (e.g., UE 120) performs operations associated with a QCL prioritization rule for control channel repetition.

As shown in FIG. 9, in some aspects, process 900 may include receiving configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET (block 910). For example, the UE (e.g., using reception component 1302, depicted in FIG. 13) may receive configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET, as described above.

As further shown in FIG. 9, in some aspects, process 900 may include monitoring, based at least in part on the configuration information, PDCCH for a first set of CORESETs and a second set of CORESETs that at least partially overlap with each other in time, wherein PDCCH monitoring for the first set of CORESETs is based at least in part on a first spatial QCL property and PDCCH monitoring for the second set of CORESETs is based at least in part on a second spatial QCL property different than the first spatial QCL property (block 920). For example, the UE (e.g., using monitoring component 1308, depicted in FIG. 13) may monitor, based at least in part on the configuration information, PDCCH for a first set of CORESETs and a second set of CORESETs that at least partially overlap with each other in time, wherein PDCCH monitoring for the first set of CORESETs is based at least in part on a first spatial QCL property and PDCCH monitoring for the second set of CORESETs is based at least in part on a second spatial QCL property different than the first spatial QCL property, as described above.

Process 900 may include additional aspects, such as any single aspect or any combination of aspects described below and/or in connection with one or more other processes described elsewhere herein.

In a first aspect, process 900 includes selecting the first set of CORESETs from a plurality of CORESETs based at least in part on a priority rule, and selecting the second set of CORESETs from the plurality of CORESETs, excluding the first set of CORESETs, based at least in part on the priority rule.

In a second aspect, alone or in combination with the first aspect, the priority rule is a search space type first, carrier index second, search space set index third priority rule.

In a third aspect, alone or in combination with one or more of the first and second aspects, process 900 includes determining the first spatial QCL property based at least in part on the first set of CORESETs, and determining the second spatial QCL property based at least in part on the second set of CORESETs.

In a fourth aspect, alone or in combination with one or more of the first through third aspects, selecting the first set of CORESETs further comprises selecting a CORESET of the first set of CORESETs based at least in part on a priority rule, and identifying a remainder of CORESETs of the first set of CORESETs based at least in part on the remainder of CORESETs having a same spatial QCL property as the selected CORESET.

In a fifth aspect, alone or in combination with one or more of the first through fourth aspects, process 900 includes selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition, and selecting the second set of CORESETs to include the other CORESET.

In a sixth aspect, alone or in combination with one or more of the first through fifth aspects, the priority rule is a first priority rule, wherein the first set of CORESETs includes a plurality of CORESETs that are linked with other CORESETs, and wherein the selection of the second set of CORESETs is based at least in part on a second priority rule.

In a seventh aspect, alone or in combination with one or more of the first through sixth aspects, process 900 includes selecting the first set of CORESETs to include the first CORESET based at least in part on the first CORESET including the first PDCCH repetition, and selecting the second set of CORESETs to include the second CORESET based at least in part on the second CORESET including the second PDCCH repetition.

In an eighth aspect, alone or in combination with one or more of the first through seventh aspects, selecting the first set of CORESETs and the second set of CORESETs is based at least in part on a priority rule relating to the first CORESET including the first PDCCH repetition and the second CORESET including the second PDCCH repetition.

In a ninth aspect, alone or in combination with one or more of the first through eighth aspects, the UE is capable of contemporaneous communication using at least two spatial QCL properties, and performing the PDCCH monitoring for the first set of CORESETs and the second set of CORESETs is based at least in part on the UE being capable of contemporaneous communication using at least two spatial QCL properties.

In a tenth aspect, alone or in combination with one or more of the first through ninth aspects, process 900 includes transmitting information indicating that the UE is capable of contemporaneous communication using at least two spatial QCL properties, wherein the configuration information is based at least in part on the information indicating that the UE is capable of contemporaneous communication using at least two spatial QCL properties.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
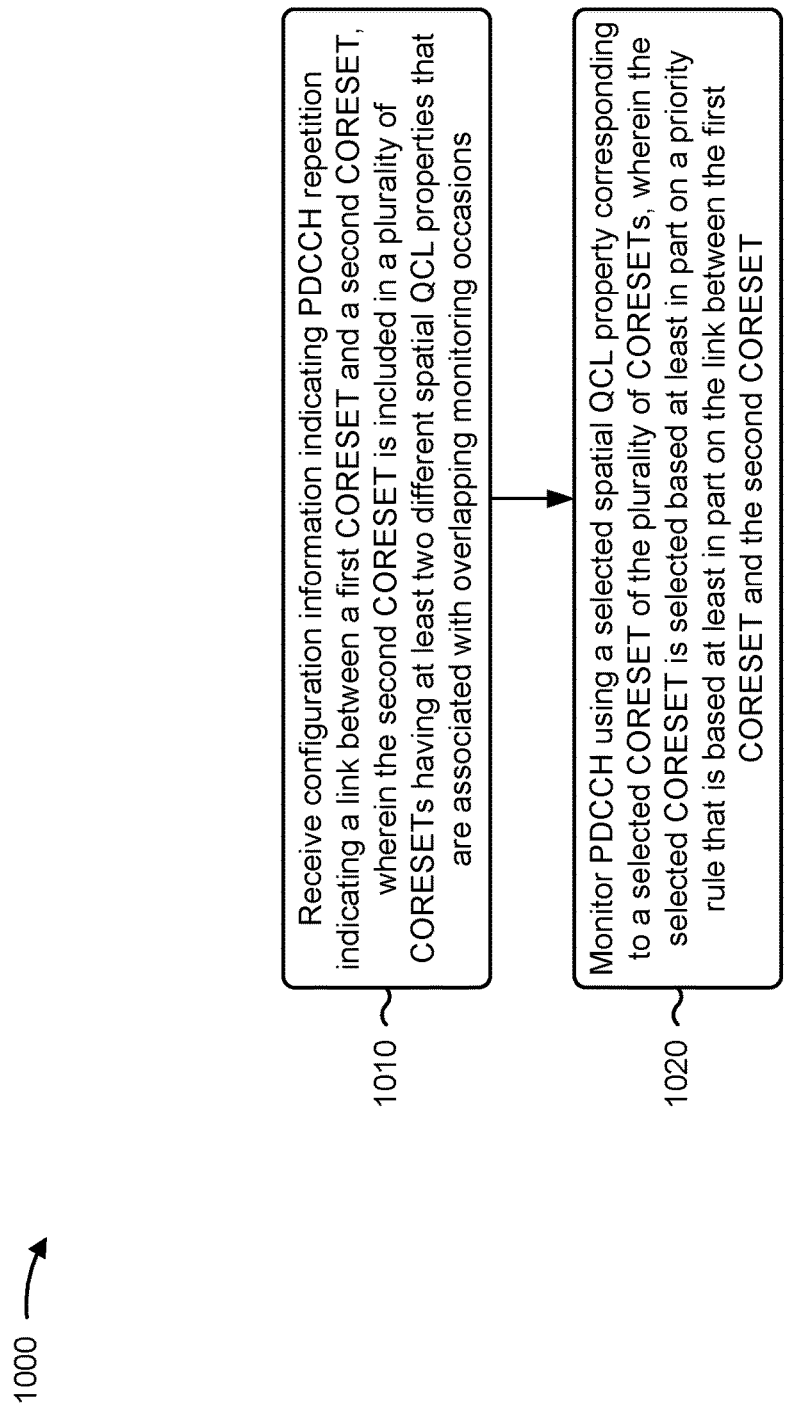

FIG. 10 is a diagram illustrating an example process 1000 performed, for example, by an UE, in accordance with the present disclosure. Example process 1000 is an example where the UE (e.g., UE 120) performs operations associated with techniques for quasi-colocation prioritization rule for.

As shown in FIG. 10, in some aspects, process 1000 may include receiving configuration information indicating PDCCH repetition indicating a link between a first CORESET and a second CORESET, wherein the second CORESET is included in a plurality of CORESETs having at least two different spatial QCL properties that are associated with overlapping monitoring occasions (block 1010). For example, the UE (e.g., using reception component 1302, depicted in FIG. 13) may receive configuration information indicating PDCCH repetition indicating a link between a first CORESET and a second CORESET, wherein the second CORESET is included in a plurality of CORESETs having at least two different spatial QCL properties that are associated with overlapping monitoring occasions, as described above.

As further shown in FIG. 10, in some aspects, process 1000 may include monitoring PDCCH using a selected spatial QCL property corresponding to a selected CORESET of the plurality of CORESETs, wherein the selected CORESET is selected based at least in part on a priority rule that is based at least in part on the link between the first CORESET and the second CORESET (block 1020). For example, the UE (e.g., using monitoring component 1308, depicted in FIG. 13) may monitor PDCCH (e.g., may monitor PDCCH candidates, may monitor for a PDCCH transmission, or the like) using a selected spatial QCL property corresponding to a selected CORESET of the plurality of CORESETs, wherein the selected CORESET is selected based at least in part on a priority rule that is based at least in part on the link between the first CORESET and the second CORESET, as described above.

Process 1000 may include additional aspects, such as any single aspect or any combination of aspects described below and/or in connection with one or more other processes described elsewhere herein.

In a first aspect, the priority rule prioritizes PDCCH repetition linkage over one or more other parameters for selection of the selected CORESET.

In a second aspect, alone or in combination with the first aspect, the selected CORESET is the second CORESET.

In a third aspect, alone or in combination with one or more of the first and second aspects, the priority rule prioritizes PDCCH repetition linkage over one or more other parameters for selection of the selected CORESET based at least in part on a monitoring occasion of the second CORESET being associated with the link between the first CORESET and the second CORESET.

In a fourth aspect, alone or in combination with one or more of the first through third aspects, the priority rule prioritizes PDCCH repetition linkage over all other parameters for selection of the selected CORESET.

In a fifth aspect, alone or in combination with one or more of the first through fourth aspects, the priority rule is a PDCCH repetition linkage first, search space type second, carrier index third, search space set index fourth priority rule.

In a sixth aspect, alone or in combination with one or more of the first through fifth aspects, the priority rule is a search space type first, PDCCH repetition linkage second, carrier index third, search space set index fourth priority rule.

In a seventh aspect, alone or in combination with one or more of the first through sixth aspects, the first CORESET is in a monitoring occasion that does not overlap the overlapping monitoring occasions.

In an eighth aspect, alone or in combination with one or more of the first through seventh aspects, at least two CORESETs of the plurality of CORESETs are on different component carriers.

In a ninth aspect, alone or in combination with one or more of the first through eighth aspects, the plurality of CORESETs are on a single component carrier.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
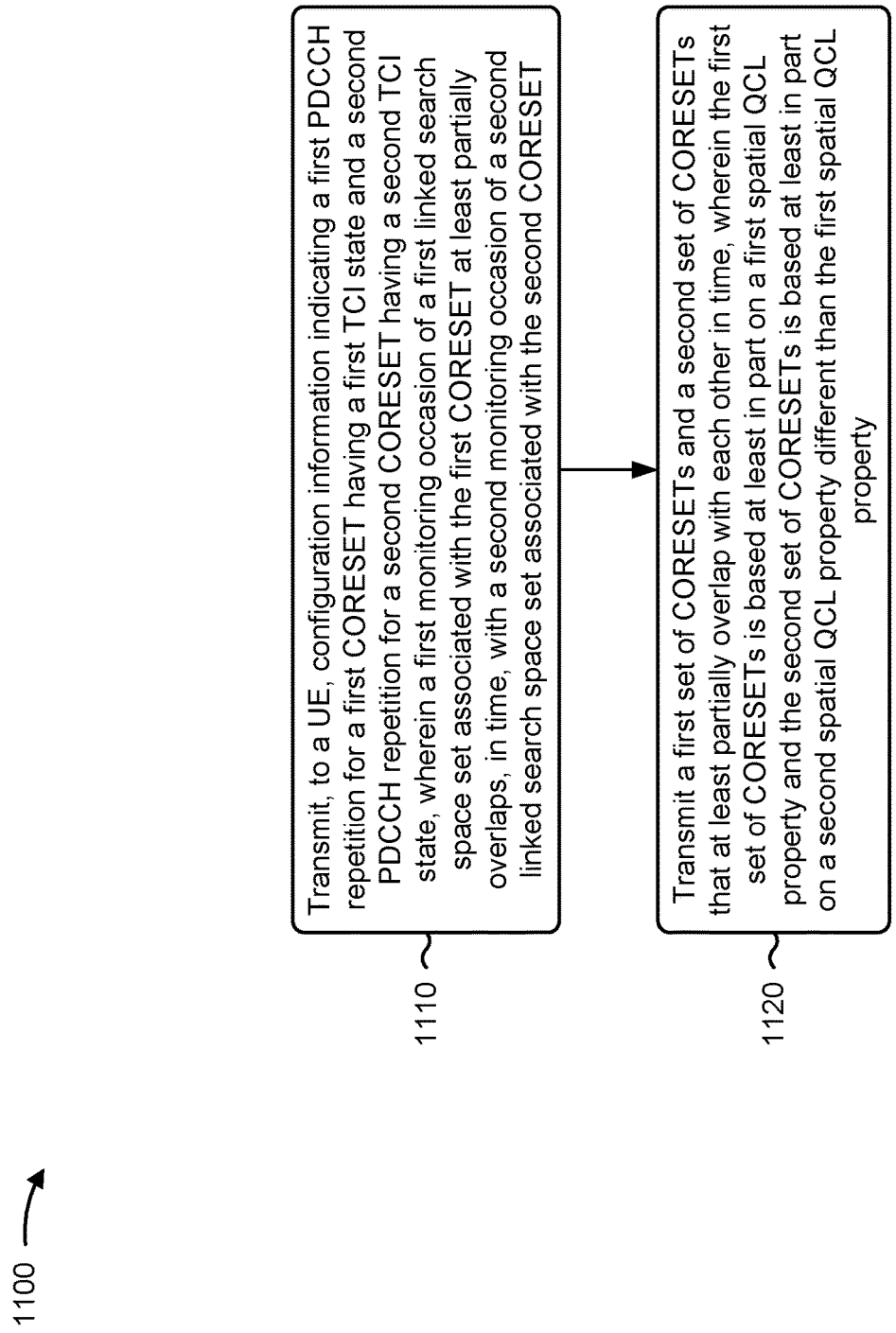

FIG. 11 is a diagram illustrating an example process 1100 performed, for example, by a base station, in accordance with the present disclosure. Example process 1100 is an example where the base station (e.g., base station 110) performs operations associated with techniques for QCL prioritization.

As shown in FIG. 11, in some aspects, process 1100 may include transmitting, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET (block 1110). For example, the base station (e.g., using transmission component 1404, depicted in FIG. 14) may transmit, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET, as described above.

As further shown in FIG. 11, in some aspects, process 1100 may include transmitting a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property (block 1120). For example, the base station (e.g., using transmission component 1404, depicted in FIG. 14) may transmit a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property, as described above.

Process 1100 may include additional aspects, such as any single aspect or any combination of aspects described below and/or in connection with one or more other processes described elsewhere herein.

In a first aspect, process 1100 includes selecting the first set of CORESETs from a plurality of CORESETs based at least in part on a priority rule, and selecting the second set of CORESETs from the plurality of CORESETs, excluding the first set of CORESETs, based at least in part on the priority rule.

In a second aspect, alone or in combination with the first aspect, the priority rule is a search space type first, carrier index second, search space set index third priority rule.

In a third aspect, alone or in combination with one or more of the first and second aspects, process 1100 includes determining the first spatial QCL property based at least in part on the first set of CORESETs, and determining the second spatial QCL property based at least in part on the second set of CORESETs.

In a fourth aspect, alone or in combination with one or more of the first through third aspects, selecting the first set of CORESETs further comprises selecting a CORESET of the first set of CORESETs based at least in part on a priority rule, and identifying a remainder of CORESETs of the first set of CORESETs based at least in part on the remainder of CORESETs having a same spatial QCL property as the selected CORESET.

In a fifth aspect, alone or in combination with one or more of the first through fourth aspects, process 1100 includes selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition, and selecting the second set of CORESETs to include the other CORESET.

In a sixth aspect, alone or in combination with one or more of the first through fifth aspects, the priority rule is a first priority rule, wherein the first set of CORESETs includes a plurality of CORESETs that are linked with other CORESETs, and wherein the selection of the second set of CORESETs is based at least in part on a second priority rule.

In a seventh aspect, alone or in combination with one or more of the first through sixth aspects, process 1100 includes selecting the first set of CORESETs to include the first CORESET based at least in part on the first CORESET including the first PDCCH repetition, and selecting the second set of CORESETs to include the second CORESET based at least in part on the second CORESET including the second PDCCH repetition.

In an eighth aspect, alone or in combination with one or more of the first through seventh aspects, selecting the first set of CORESETs and the second set of CORESETs is based at least in part on a priority rule relating to the first CORESET including the first PDCCH repetition and the second CORESET including the second PDCCH repetition.

In a ninth aspect, alone or in combination with one or more of the first through eighth aspects, the UE is capable of contemporaneous communication using at least two spatial QCL properties, and performing the PDCCH monitoring for the first set of CORESETs and the second set of CORESETs is based at least in part on the UE being capable of contemporaneous communication using at least two spatial QCL properties.

In a tenth aspect, alone or in combination with one or more of the first through ninth aspects, process 1100 includes receiving information indicating that the UE is capable of contemporaneous communication using at least two spatial QCL properties, wherein the configuration information is based at least in part on the information indicating that the UE is capable of contemporaneous communication using at least two spatial QCL properties.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
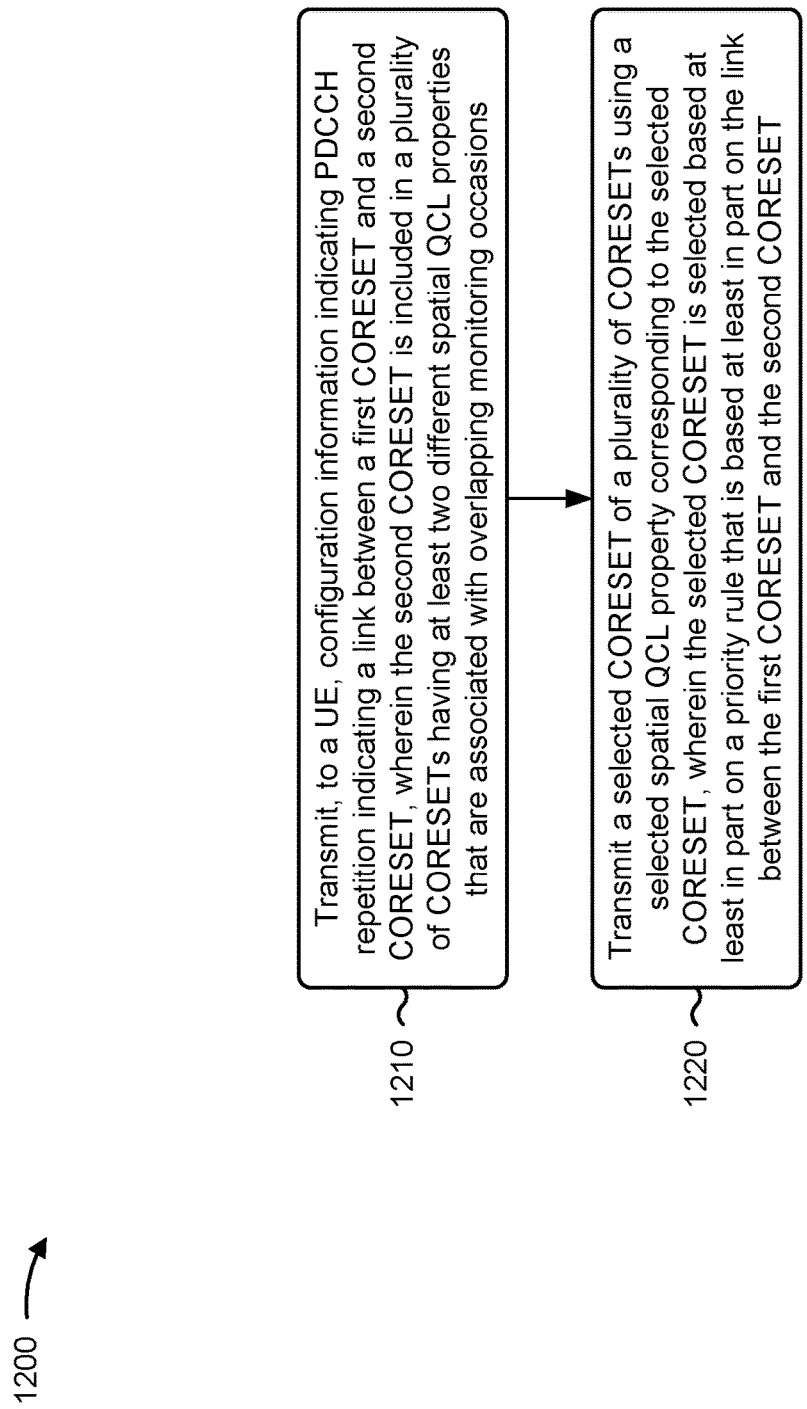

FIG. 12 is a diagram illustrating an example process 1200 performed, for example, by a base station, in accordance with the present disclosure. Example process 1200 is an example where the base station (e.g., base station 110) performs operations associated with techniques for QCL prioritization.

As shown in FIG. 12, in some aspects, process 1200 may include transmitting, to a UE, configuration information indicating PDCCH repetition indicating a link between a first CORESET and a second CORESET, wherein the second CORESET is included in a plurality of CORESETs having at least two different spatial QCL properties that are associated with overlapping monitoring occasions (block 1210). For example, the base station (e.g., using transmission component 1404, depicted in FIG. 14) may transmit, to a UE, configuration information indicating PDCCH repetition indicating a link between a first CORESET and a second CORESET, wherein the second CORESET is included in a plurality of CORESETs having at least two different spatial QCL properties that are associated with overlapping monitoring occasions, as described above.

As further shown in FIG. 12, in some aspects, process 1200 may include transmitting a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET (block 1220). For example, the base station (e.g., using transmission component 1404, depicted in FIG. 14) may transmit a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET, as described above.

Process 1200 may include additional aspects, such as any single aspect or any combination of aspects described below and/or in connection with one or more other processes described elsewhere herein.

In a first aspect, the priority rule prioritizes PDCCH repetition linkage over one or more other parameters for selection of the selected CORESET.

In a second aspect, alone or in combination with the first aspect, the selected CORESET is the second CORESET.

In a third aspect, alone or in combination with one or more of the first and second aspects, the priority rule prioritizes PDCCH repetition linkage over one or more other parameters for selection of the selected CORESET based at least in part on a monitoring occasion of the second CORESET being associated with the link between the first CORESET and the second CORESET.

In a fourth aspect, alone or in combination with one or more of the first through third aspects, the priority rule prioritizes PDCCH repetition linkage over all other parameters for selection of the selected CORESET.

In a fifth aspect, alone or in combination with one or more of the first through fourth aspects, the priority rule is a PDCCH repetition linkage first, search space type second, carrier index third, search space set index fourth priority rule.

In a sixth aspect, alone or in combination with one or more of the first through fifth aspects, the priority rule is a search space type first, PDCCH repetition linkage second, carrier index third, search space set index fourth priority rule.

In a seventh aspect, alone or in combination with one or more of the first through sixth aspects, the first CORESET is in a monitoring occasion that does not overlap the overlapping monitoring occasions.

In an eighth aspect, alone or in combination with one or more of the first through seventh aspects, at least two CORESETs of the plurality of CORESETs are on different component carriers.

In a ninth aspect, alone or in combination with one or more of the first through eighth aspects, the plurality of CORESETs are on a single component carrier.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
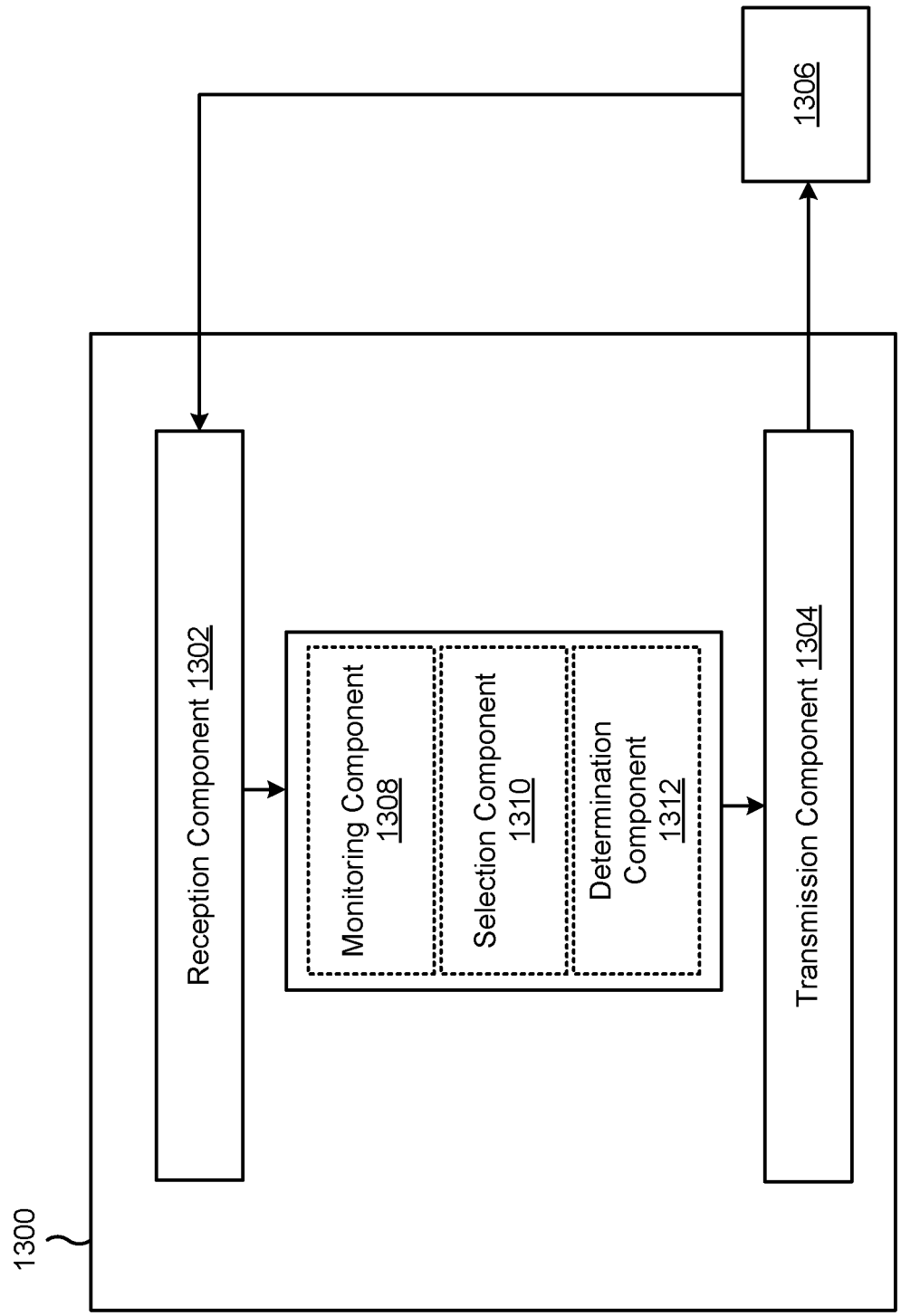
FIGS. 13-14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a monitoring component 1308, a selection component 1310, and a determination component 1312, among other examples.

In some aspects, the apparatus 1300 may be configured to perform one or more operations described herein in connection with FIGS. 3-8. Additionally, or alternatively, the apparatus 1300 may be configured to perform one or more processes described herein, such as process 900 of FIG. 9, process 1000 of FIG. 10, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET. The monitoring component 1308 may monitor, based at least in part on the configuration information, PDCCH for a first set of CORESETs and a second set of CORESETs that at least partially overlap with each other in time, wherein PDCCH monitoring for the first set of CORESETs is based at least in part on a first spatial QCL property and PDCCH monitoring for the second set of CORESETs is based at least in part on a second spatial QCL property different than the first spatial QCL property.

The selection component 1310 may select the first set of CORESETs from a plurality of CORESETs based at least in part on a priority rule; and select the second set of CORESETs from the plurality of CORESETs, excluding the first set of CORESETs, based at least in part on the priority rule.

The determination component 1312 may determine the first spatial QCL property based at least in part on the first set of CORESETs and the second spatial QCL property based at least in part on the second set of CORESETs.

The selection component 1310 may select the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition.

The selection component 1310 may select the second set of CORESETs to include the other CORESET.

The selection component 1310 may select the first set of CORESETs to include the first CORESET based at least in part on the first CORESET including the first PDCCH repetition.

The selection component 1310 may select the second set of CORESETs to include the second CORESET based at least in part on the second CORESET including the second PDCCH repetition.

The transmission component 1304 may transmit information indicating that the UE is capable of contemporaneous communication using at least two spatial QCL properties, wherein the configuration information is based at least in part on the information indicating that the UE is capable of contemporaneous communication using at least two spatial QCL properties.

The reception component 1302 may receive configuration information indicating PDCCH repetition indicating a link between a first CORESET and a second CORESET, wherein the second CORESET is included in a plurality of CORESETs having at least two different spatial QCL properties that are associated with overlapping monitoring occasions. The monitoring component 1308 may monitor PDCCH using a selected spatial QCL property corresponding to a selected CORESET of the plurality of CORESETs, wherein the selected CORESET is selected based at least in part on a priority rule that is based at least in part on the link between the first CORESET and the second CORESET.

The transmission component 1304 may transmit, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET. The transmission component 1304 may transmit a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
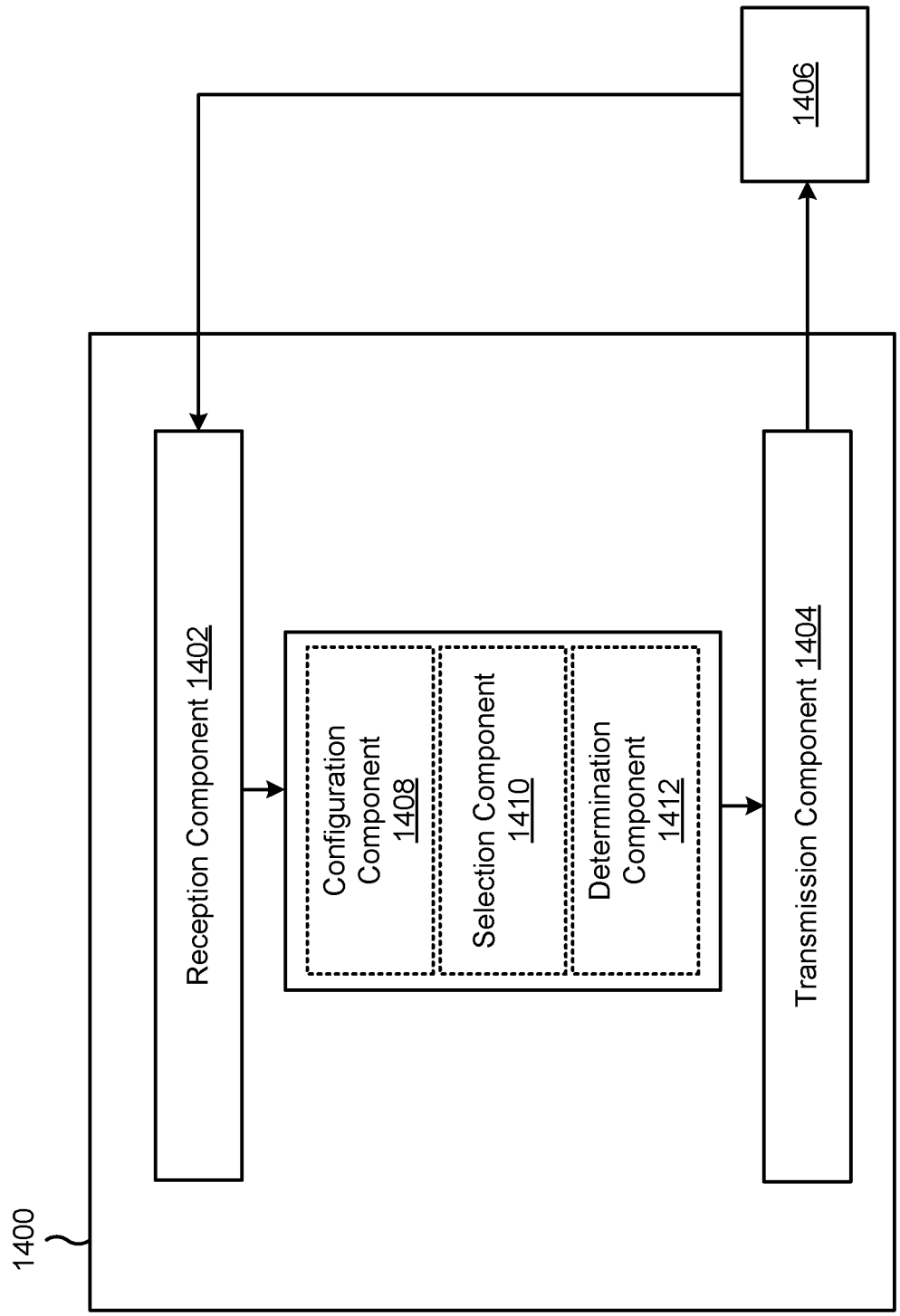

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a configuration component 1408, a selection component 1410, or a determination component 1412, among other examples.

In some aspects, the apparatus 1400 may be configured to perform one or more operations described herein in connection with FIGS. 3-8. Additionally, or alternatively, the apparatus 1400 may be configured to perform one or more processes described herein, such as process 1100 of FIG. 11, process 1200 of FIG. 12, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The transmission component 1404 and/or the configuration component 1408 may transmit, to a UE, configuration information indicating a first PDCCH repetition for a first CORESET having a first TCI state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET. The transmission component 1404 may transmit a first set of CORESETs and a second set of CORESETs that at least partially overlap with each other in time, wherein the first set of CORESETs is based at least in part on a first spatial QCL property and the second set of CORESETs is based at least in part on a second spatial QCL property different than the first spatial QCL property.

The selection component 1410 may select the first set of CORESETs from a plurality of CORESETs based at least in part on a priority rule.

The selection component 1410 may select the second set of CORESETs from the plurality of CORESETs, excluding the first set of CORESETs, based at least in part on the priority rule.

The determination component 1412 may determine the first spatial QCL property based at least in part on the first set of CORESETs.

The determination component 1412 may determine the second spatial QCL property based at least in part on the second set of CORESETs.

The selection component 1410 may select the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition.

The selection component 1410 may select the second set of CORESETs to include the other CORESET.

The selection component 1410 may select the first set of CORESETs to include the first CORESET based at least in part on the first CORESET including the first PDCCH repetition.

The selection component 1410 may select the second set of CORESETs to include the second CORESET based at least in part on the second CORESET including the second PDCCH repetition.

The reception component 1402 may receive information indicating that the UE is capable of contemporaneous communication using at least two spatial QCL properties, wherein the configuration information is based at least in part on the information indicating that the UE is capable of contemporaneous communication using at least two spatial QCL properties.

The transmission component 1404 may transmit, to a UE, configuration information indicating PDCCH repetition indicating a link between a first CORESET and a second CORESET, wherein the second CORESET is included in a plurality of CORESETs having at least two different spatial QCL properties that are associated with overlapping monitoring occasions. The transmission component 1404 may transmit a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some aspects of the present disclosure:

Aspect 1: A method of wireless communication performed by a user equipment (UE), comprising: receiving configuration information indicating a first physical downlink control channel (PDCCH) repetition for a first control resource set (CORESET) having a first transmission configuration indicator (TCI) state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and monitoring, based at least in part on the configuration information, PDCCH for a first set of CORESETs and a second set of CORESETs that at least partially overlap with each other in time, wherein PDCCH monitoring for the first set of CORESETs is based at least in part on a first spatial quasi-colocation (QCL) property and PDCCH monitoring for the second set of CORESETs is based at least in part on a second spatial QCL property different than the first spatial QCL property.

Aspect 2: The method of aspect 1, further comprising: selecting the first set of CORESETs from a plurality of CORESETs based at least in part on a priority rule; and selecting the second set of CORESETs from the plurality of CORESETs, excluding the first set of CORESETs, based at least in part on the priority rule.

Aspect 3: The method of aspect 2, wherein the priority rule is a search space type first, carrier index second, search space set index third priority rule.

Aspect 4: The method of any of aspects 1-3, further comprising: determining the first spatial QCL property based at least in part on the first set of CORESETs; and determining the second spatial QCL property based at least in part on the second set of CORESETs.

Aspect 5: The method of aspect 1 or aspect 4, wherein selecting the first set of CORESETs further comprises: selecting a CORESET of the first set of CORESETs based at least in part on a priority rule; and identifying a remainder of CORESETs of the first set of CORESETs based at least in part on the remainder of CORESETs having a same spatial QCL property as the selected CORESET.

Aspect 6: The method of aspect 1 or aspect 4, further comprising: selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and selecting the second set of CORESETs to include the other CORESET.

Aspect 7: The method of aspect 6, wherein the priority rule is a first priority rule, wherein the first set of CORESETs includes a plurality of CORESETs that are linked with other CORESETs, and wherein the selection of the second set of CORESETs is based at least in part on a second priority rule.

Aspect 8: The method of aspect 1 or aspect 4, further comprising: selecting the first set of CORESETs to include the first CORESET based at least in part on the first CORESET including the first PDCCH repetition; and selecting the second set of CORESETs to include the second CORESET based at least in part on the second CORESET including the second PDCCH repetition.

Aspect 9: The method of aspect 8, wherein selecting the first set of CORESETs and the second set of CORESETs is based at least in part on a priority rule relating to the first CORESET including the first PDCCH repetition and the second CORESET including the second PDCCH repetition.

Aspect 10: The method of any of aspects 1-9, wherein the UE is capable of contemporaneous communication using at least two spatial QCL properties, and wherein performing the PDCCH monitoring for the first set of CORESETs and the second set of CORESETs is based at least in part on the UE being capable of contemporaneous communication using at least two spatial QCL properties.

Aspect 11: The method of aspect 10, further comprising: transmitting information indicating that the UE is capable of contemporaneous communication using at least two spatial QCL properties, wherein the configuration information is based at least in part on the information indicating that the UE is capable of contemporaneous communication using at least two spatial QCL properties.

Aspect 12: A method of wireless communication performed by a user equipment (UE), comprising: receiving configuration information indicating physical downlink control channel (PDCCH) repetition indicating a link between a first control resource set (CORESET) and a second CORESET, wherein the second CORESET is included in a plurality of CORESETs having at least two different spatial quasi-colocation (QCL) properties that are associated with overlapping monitoring occasions; and monitoring PDCCH using a selected spatial QCL property corresponding to a selected CORESET of the plurality of CORESETs, wherein the selected CORESET is selected based at least in part on a priority rule that is based at least in part on the link between the first CORESET and the second CORESET.

Aspect 13: The method of aspect 12, wherein the priority rule prioritizes PDCCH repetition linkage over one or more other parameters for selection of the selected CORESET.

Aspect 14: The method of any of aspects 12-13, wherein the selected CORESET is the second CORESET.

Aspect 15: The method of aspect 14, wherein the priority rule prioritizes PDCCH repetition linkage over one or more other parameters for selection of the selected CORESET based at least in part on a monitoring occasion of the second CORESET being associated with the link between the first CORESET and the second CORESET.

Aspect 16: The method of any of aspects 12-15, wherein the priority rule prioritizes PDCCH repetition linkage over all other parameters for selection of the selected CORESET.

Aspect 17: The method of any of aspects 12-16, wherein the priority rule is a PDCCH repetition linkage first, search space type second, carrier index third, search space set index fourth priority rule.

Aspect 18: The method of any of aspects 12-16, wherein the priority rule is a search space type first, PDCCH repetition linkage second, carrier index third, search space set index fourth priority rule.

Aspect 19: The method of any of aspects 12-18, wherein the first CORESET is in a monitoring occasion that does not overlap the overlapping monitoring occasions.

Aspect 20: The method of any of aspects 12-19, wherein at least two CORESETs of the plurality of CORESETs are on different component carriers.

Aspect 21: The method of any of aspects 12-19, wherein the plurality of CORESETs are on a single component carrier.

Aspect 22: A method of wireless communication performed by a base station, comprising: transmitting, to a user equipment (UE), configuration information indicating a first physical downlink control channel (PDCCH) repetition for a first control resource set (CORESET) having a first transmission configuration indicator (TCI) state and a second PDCCH repetition for a second CORESET having a second TCI state, wherein a first monitoring occasion of a first linked search space set associated with the first CORESET at least partially overlaps, in time, with a second monitoring occasion of a second linked search space set associated with the second CORESET; and transmitting a first set of CORESETs and a second set of CORESETs that at least partially overlap with each other in time, wherein the first set of CORESETs is based at least in part on a first spatial quasi-colocation (QCL) property and the second set of CORESETs is based at least in part on a second spatial QCL property different than the first spatial QCL property.

Aspect 23: The method of aspect 22, further comprising: selecting the first set of CORESETs from a plurality of CORESETs based at least in part on a priority rule; and selecting the second set of CORESETs from the plurality of CORESETs, excluding the first set of CORESETs, based at least in part on the priority rule.

Aspect 24: The method of aspect 23, wherein the priority rule is a search space type first, carrier index second, search space set index third priority rule.

Aspect 25: The method of any of aspects 22-24, further comprising: determining the first spatial QCL property based at least in part on the first set of CORESETs; and determining the second spatial QCL property based at least in part on the second set of CORESETs.

Aspect 26: The method of aspect 22 or aspect 25, wherein selecting the first set of CORESETs further comprises: selecting a CORESET of the first set of CORESETs based at least in part on a priority rule; and identifying a remainder of CORESETs of the first set of CORESETs based at least in part on the remainder of CORESETs having a same spatial QCL property as the selected CORESET.

Aspect 27: The method of aspect 22 or aspect 25, further comprising: selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and selecting the second set of CORESETs to include the other CORESET.

Aspect 28: The method of aspect 27, wherein the priority rule is a first priority rule, wherein the first set of CORESETs includes a plurality of CORESETs that are linked with other CORESETs, and wherein the selection of the second set of CORESETs is based at least in part on a second priority rule.

Aspect 29: The method of aspect 22 or aspect 25, further comprising: selecting the first set of CORESETs to include the first CORESET based at least in part on the first CORESET including the first PDCCH repetition; and selecting the second set of CORESETs to include the second CORESET based at least in part on the second CORESET including the second PDCCH repetition.

Aspect 30: The method of aspect 29, wherein selecting the first set of CORESETs and the second set of CORESETs is based at least in part on a priority rule relating to the first CORESET including the first PDCCH repetition and the second CORESET including the second PDCCH repetition.

Aspect 31: The method of any of aspects 22-30, wherein the UE is capable of contemporaneous communication using at least two spatial QCL properties, and wherein performing the PDCCH monitoring for the first set of CORESETs and the second set of CORESETs is based at least in part on the UE being capable of contemporaneous communication using at least two spatial QCL properties.

Aspect 32: The method of aspect 31, further comprising: receiving information indicating that the UE is capable of contemporaneous communication using at least two spatial QCL properties, wherein the configuration information is based at least in part on the information indicating that the UE is capable of contemporaneous communication using at least two spatial QCL properties.

Aspect 33: A method of wireless communication performed by a base station, comprising: transmitting, to a UE, configuration information indicating physical downlink control channel (PDCCH) repetition indicating a link between a first control resource set (CORESET) and a second CORESET, wherein the second CORESET is included in a plurality of CORESETs having at least two different spatial quasi-colocation (QCL) properties that are associated with overlapping monitoring occasions; and transmitting a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET.

Aspect 34: The method of aspect 33, wherein the priority rule prioritizes PDCCH repetition linkage over one or more other parameters for selection of the selected CORESET.

Aspect 35: The method of any of aspects 33-34, wherein the selected CORESET is the second CORESET.

Aspect 36: The method of any of aspects 33-35, wherein the priority rule prioritizes PDCCH repetition linkage over one or more other parameters for selection of the selected CORESET based at least in part on a monitoring occasion of the second CORESET being associated with the link between the first CORESET and the second CORESET.

Aspect 37: The method of any of aspects 33-36, wherein the priority rule prioritizes PDCCH repetition linkage over all other parameters for selection of the selected CORESET.

Aspect 38: The method of any of aspects 33-37, wherein the priority rule is a PDCCH repetition linkage first, search space type second, carrier index third, search space set index fourth priority rule.

Aspect 39: The method of any of aspects 33-37, wherein the priority rule is a search space type first, PDCCH repetition linkage second, carrier index third, search space set index fourth priority rule.

Aspect 40: The method of any of aspects 33-39, wherein the first CORESET is in a monitoring occasion that does not overlap the overlapping monitoring occasions.

Aspect 41: The method of any of aspects 33-40, wherein at least two CORESETs of the plurality of CORESETs are on different component carriers.

Aspect 42: The method of any of aspects 33-40, wherein the plurality of CORESETs are on a single component carrier.

Aspect 43: An apparatus for wireless communication at a device, comprising a processor; memory coupled with the processor; and instructions stored in the memory and executable by the processor to cause the apparatus to perform the method of one or more aspects of aspects 1-42.

Aspect 44: A device for wireless communication, comprising a memory and one or more processors coupled to the memory, the memory and the one or more processors configured to perform the method of one or more aspects of aspects 1-42.

Aspect 45: An apparatus for wireless communication, comprising at least one means for performing the method of one or more aspects of aspects 1-42.

Aspect 46: A non-transitory computer-readable medium storing code for wireless communication, the code comprising instructions executable by a processor to perform the method of one or more aspects of aspects 1-42.

Aspect 47: A non-transitory computer-readable medium storing a set of instructions for wireless communication, the set of instructions comprising one or more instructions that, when executed by one or more processors of a device, cause the device to perform the method of one or more aspects of aspects 1-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving configuration information indicating a first physical downlink control channel (PDCCH) repetition for a first control resource set (CORESET) having a first transmission configuration indicator (TCI) state and a second PDCCH repetition for a second CORESET having a second TCI state, wherein a first monitoring occasion of a first search space set associated with the first CORESET at least partially overlaps, in time, with a second monitoring occasion of a second search space set associated with the second CORESET, wherein the first search space set and the second search space set are linked;
    selecting a CORESET, having a first spatial quasi-colocation (QCL) property, of a first set of CORESETs based at least in part on a priority rule;
    identifying a remainder of CORESETs of the first set of CORESETs based at least in part on the remainder of CORESETs having a same spatial QCL property as the first spatial QCL property; and
    monitoring, based at least in part on the configuration information, PDCCH for the first set of CORESETs and a second set of CORESETs that at least partially overlap with each other in time, wherein PDCCH monitoring for the first set of CORESETs is based at least in part on the first spatial QCL property and PDCCH monitoring for the second set of CORESETs is based at least in part on a second spatial QCL property different than the first spatial QCL property.

2. The method of claim 1, further comprising:
    selecting the first set of CORESETs from a plurality of CORESETs based at least in part on a priority rule; and
    selecting the second set of CORESETs from the plurality of CORESETs, excluding the first set of CORESETs, based at least in part on the priority rule.

3. The method of claim 2, wherein the priority rule is a search space type first, carrier index second, search space set index third priority rule.

4. The method of claim 3, wherein the search space type comprises a common search space (CSS) type or a UE-specific search space (USS) type.

5. The method of claim 3, wherein the carrier index corresponds to a serving cell index.

6. The method of claim 1, further comprising:
    determining the first spatial QCL property based at least in part on the first set of CORESETs; and
    determining the second spatial QCL property based at least in part on the second set of CORESETs.

7. The method of claim 6, wherein the first spatial QCL property is indicated by the first TCI state and the second spatial QCL property is indicated by the second TCI state.

8. The method of claim 1, further comprising:
    selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and selecting the second set of CORESETs to include the other CORESET.

9. The method of claim 8, wherein the priority rule is a first priority rule, wherein the first set of CORESETs includes multiple CORESETs that are linked with other CORESETs, and wherein the selection of the second set of CORESETs is based at least in part on a second priority rule.

10. The method of claim 9, wherein the first priority rule is a search space type first, carrier index second, search space set index third priority rule.

11. The method of claim 9, wherein the second priority rule is based at least in part on at least one of:
a search space type,
a search space set index, or
a carrier index.

12. The method of claim 1, further comprising:
selecting the first set of CORESETs to include the first CORESET based at least in part on the first CORESET including the first PDCCH repetition; and
selecting the second set of CORESETs to include the second CORESET based at least in part on the second CORESET including the second PDCCH repetition.

13. The method of claim 1, wherein the UE is capable of contemporaneous communication using at least two spatial QCL properties, and wherein performing the PDCCH monitoring for the first set of CORESETs and the second set of CORESETs is based at least in part on the UE being capable of contemporaneous communication using at least two spatial QCL properties.

14. The method of claim 13, further comprising:
transmitting information indicating that the UE is capable of contemporaneous communication using at least two spatial QCL properties, wherein the configuration information is based at least in part on the information indicating that the UE is capable of contemporaneous communication using at least two spatial QCL properties.

15. A method of wireless communication performed by a base station, comprising:
transmitting, to a user equipment (UE), configuration information indicating a first physical downlink control channel (PDCCH) repetition for a first control resource set (CORESET) having a first transmission configuration indicator (TCI) state and a second PDCCH repetition for a second CORESET having a second TCI state, wherein a first monitoring occasion of a first search space set associated with the first CORESET at least partially overlaps, in time, with a second monitoring occasion of a second search space set associated with the second CORESET, wherein the first search space set and the second search space set are linked;
selecting a CORESET, having a first spatial quasi-colocation (QCL) property, of a first set of CORESETs based at least in part on a priority rule;
identifying a remainder of CORESETs of the first set of CORESETs based at least in part on the remainder of CORESETs having a same spatial QCL property as the first spatial QCL property; and
transmitting the first set of CORESETs and a second set of CORESETs that at least partially overlap with each other in time, wherein the first set of CORESETs is based at least in part on the first QCL property and the second set of CORESETs is based at least in part on a second spatial QCL property different than the first spatial QCL property.

16. The method of claim 15, further comprising:
selecting the first set of CORESETs from a plurality of CORESETs based at least in part on a priority rule; and
selecting the second set of CORESETs from the plurality of CORESETs, excluding the first set of CORESETs, based at least in part on the priority rule.

17. The method of claim 16, wherein the priority rule is a search space type first, carrier index second, search space set index third priority rule.

18. The method of claim 17, wherein the search space type comprises a common search space (CSS) type or a UE-specific search space (USS) type.

19. The method of claim 17, wherein the carrier index corresponds to a serving cell index.

20. The method of claim 15, further comprising:
determining the first spatial QCL property based at least in part on the first set of CORESETs; and
determining the second spatial QCL property based at least in part on the second set of CORESETs.

21. The method of claim 15, further comprising:
selecting the first set of CORESETs from a plurality of CORESETs based at least in part on a priority rule, wherein the first set of CORESETs includes a particular CORESET in which there is a PDCCH repetition linked with another PDCCH repetition in another CORESET, at least partially overlapped with the first CORESET, based at least in part on PDCCH repetition; and
selecting the second set of CORESETs to include the other CORESET.

22. The method of claim 21, wherein the priority rule is a first priority rule, wherein the first set of CORESETs includes multiple CORESETs that are linked with other CORESETs, and wherein the selection of the second set of CORESETs is based at least in part on a second priority rule.

23. The method of claim 22, wherein the first priority rule is a search space type first, carrier index second, search space set index third priority rule.

24. The method of claim 22, wherein the second priority rule is based at least in part on at least one of:
a search space type,
a search space set index, or
a carrier index.

25. The method of claim 15, further comprising:
selecting the first set of CORESETs to include the first CORESET based at least in part on the first CORESET including the first PDCCH repetition; and
selecting the second set of CORESETs to include the second CORESET based at least in part on the second CORESET including the second PDCCH repetition.

26. The method of claim 25, wherein the selection of the first set of CORESETs and the second set of CORESETs is based at least in part on a priority rule relating to the first CORESET including the first PDCCH repetition and the second CORESET including the second PDCCH repetition.

27. The method of claim 15, wherein the UE is capable of contemporaneous communication using at least two spatial QCL properties, and wherein performing the PDCCH monitoring for the first set of CORESETs and the second set of CORESETs is based at least in part on the UE being capable of contemporaneous communication using at least two spatial QCL properties.

28. The method of claim 27, further comprising:
receiving information indicating that the UE is capable of contemporaneous communication using at least two spatial QCL properties, wherein the configuration information is based at least in part on the information indicating that the UE is capable of contemporaneous communication using at least two spatial QCL properties.

29. A method of wireless communication performed by a user equipment (UE), comprising:
receiving configuration information indicating physical downlink control channel (PDCCH) repetition indicating a link between a first control resource set (CORESET) and a second CORESET, wherein the second CORESET is included in a plurality of CORESETs having at least two different spatial quasi-colocation (QCL) properties that are associated with overlapping monitoring occasions; and
monitoring PDCCH using a selected spatial QCL property corresponding to a selected CORESET of the plurality of CORESETs, wherein the selected CORESET is selected based at least in part on a priority rule that is based at least in part on the link between the first CORESET and the second CORESET, wherein the priority rule prioritizes PDCCH repetition linkage over one or more other parameters for selection of the selected CORESET.

30. A method of wireless communication performed by a base station, comprising:
transmitting, to a user equipment (UE), configuration information indicating physical downlink control channel (PDCCH) repetition indicating a link between a first control resource set (CORESET) and a second CORESET, wherein the second CORESET is included in a plurality of CORESETs having at least two different spatial quasi-colocation (QCL) properties that are associated with overlapping monitoring occasions; and
transmitting a selected CORESET of a plurality of CORESETs using a selected spatial QCL property corresponding to the selected CORESET, wherein the selected CORESET is selected based at least in part on a priority rule that is based at least in part on the link between the first CORESET and the second CORESET, wherein the priority rule prioritizes PDCCH repetition linkage over one or more other parameters for selection of the selected CORESET.

\* \* \* \* \*